US012776576B2

(12) United States Patent
Neenan et al.

(10) Patent No.: US 12,776,576 B2
(45) Date of Patent: Oct. 27, 2026

(54) ANTENNA SYSTEMS

(71) Applicant: Parsec Technologies, Inc., Plano, TX (US)

(72) Inventors: Michael A Neenan, Plano, TX (US); Richard Loy Smith, Jr., Dallas, TX (US); Rauhon Ahmed Shaik, Wylie, TX (US); George Alexander Bednekoff, Plano, TX (US)

(73) Assignee: Parsec Technologies, Inc., Plano, TX (US)

( * ) Notice: Subject to any disclaimer, the term of this patent is extended or adjusted under 35 U.S.C. 154(b) by 13 days.

(21) Appl. No.: 18/894,607

(22) Filed: Sep. 24, 2024

(65) Prior Publication Data

US 2025/0158281 A1 May 15, 2025

Related U.S. Application Data

(60) Provisional application No. 63/585,541, filed on Sep. 26, 2023.

(51) Int. Cl.
*H01Q 5/307* (2015.01)
*H01Q 5/20* (2015.01)

(52) U.S. Cl.
CPC ............... *H01Q 5/307* (2015.01); *H01Q 5/20* (2015.01)

(58) Field of Classification Search
CPC .......... H01Q 5/307; H01Q 5/20; H01Q 5/371; H01Q 21/20065; H01Q 21/067; H01Q 1/1228; H01Q 1/42
See application file for complete search history.

(56) References Cited

U.S. PATENT DOCUMENTS

| | | | |
|---|---|---|---|
| 5,966,102 | A | 10/1999 | Runyon |
| 6,067,053 | A | 5/2000 | Runyon |
| 6,111,550 | A | 8/2000 | Miller et al. |
| 6,618,013 | B1 | 9/2003 | Aldous |
| 9,379,453 | B2 | 6/2016 | Rentz |
| 10,224,615 | B2 | 3/2019 | Wu |

(Continued)

FOREIGN PATENT DOCUMENTS

| | | |
|---|---|---|
| CN | 102097674 | 6/2011 |
| CN | 102468529 | 5/2012 |

(Continued)

OTHER PUBLICATIONS

Balling et al., "Broadband Dual Polarized Antenna Arrays for Mobile Communication Applications", 33rd European Microwave Conference Proceedings IEEE, Oct. 7, 2003, Munich, Germany, p. 1-4.

*Primary Examiner* — Henry Luong
(74) *Attorney, Agent, or Firm* — Knobbe, Martens, Olson & Bear, LLP

(57) ABSTRACT

A multi-band antenna can include a radiating element. The radiating element can include an upright portion, a head portion, one or more first arms, and one or more second arms. The upright portion can be configured for low-band radiation. The head portion can extend from a top edge of the upright portion and can be configured for low-band radiation. The one or more first arms can extend from the upright portion and can be configured for mid-band radiation. The one or more second arms can extend from the upright portion and can be configured for C-band radiation.

20 Claims, 13 Drawing Sheets

(56) References Cited

U.S. PATENT DOCUMENTS

| | | | |
|---|---|---|---|
| 10,312,583 | B2 | 6/2019 | Ng |
| 10,511,086 | B1 | 12/2019 | Thill |
| 11,251,539 | B2 | 2/2022 | Hinman |
| 11,283,149 | B2 | 3/2022 | Neenan et al. |
| 11,329,363 | B1 | 5/2022 | Neenan et al. |
| 11,658,382 | B2 | 5/2023 | Neenan et al. |
| 11,664,574 | B2 | 5/2023 | Neenan et al. |
| 11,909,090 | B2 | 2/2024 | Neenan et al. |
| 11,936,094 | B2 | 3/2024 | Neenan et al. |
| 12,057,641 | B2 | 8/2024 | Neenan et al. |
| 12,212,035 | B2 | 1/2025 | Neenan et al. |
| 12,266,845 | B2 | 4/2025 | Neenan et al. |
| 12,537,318 | B2 | 1/2026 | Neenan et al. |
| 12,548,922 | B2 | 2/2026 | Neenan et al. |
| 2008/0180333 | A1 | 7/2008 | Martiskainen |
| 2010/0206523 | A1 | 8/2010 | Chen |
| 2010/0253584 | A1 | 10/2010 | Yang et al. |
| 2011/0080323 | A1 | 4/2011 | Thiam |
| 2011/0102278 | A1 | 5/2011 | Rozan |
| 2012/0146872 | A1 | 6/2012 | Chainon et al. |
| 2012/0280882 | A1 | 11/2012 | Zimmerman |
| 2013/0082893 | A1 | 4/2013 | Wang |
| 2014/0139387 | A1 | 5/2014 | Jones et al. |
| 2014/0375507 | A1 | 12/2014 | Lin et al. |
| 2015/0042521 | A1 | 2/2015 | Hazen |
| 2015/0102974 | A1 | 4/2015 | Stoytchev et al. |
| 2015/0357714 | A1 | 12/2015 | Ng |
| 2016/0172750 | A1 | 6/2016 | Ng |
| 2016/0248148 | A1 | 8/2016 | Hill et al. |
| 2016/0277062 | A1 | 9/2016 | Cheon et al. |
| 2016/0285161 | A1 | 9/2016 | Apaydin et al. |
| 2017/0062952 | A1 | 3/2017 | Sundararajan |
| 2017/0237158 | A1 | 8/2017 | Gibson et al. |
| 2017/0317428 | A1 | 11/2017 | Petropoulos |
| 2017/0324171 | A1 | 11/2017 | Shehan |
| 2017/0358842 | A1 | 12/2017 | Shehan |
| 2018/0062731 | A1 | 3/2018 | Ng et al. |
| 2018/0083348 | A1 | 3/2018 | Thiam et al. |
| 2018/0109006 | A1 | 4/2018 | Ng et al. |
| 2018/0323513 | A1 | 11/2018 | Varnoosfaderani et al. |
| 2019/0148825 | A1 | 5/2019 | Huerta et al. |
| 2019/0237850 | A1 | 8/2019 | Fleischer et al. |
| 2019/0305406 | A1 | 10/2019 | Williams |
| 2019/0341674 | A1 | 11/2019 | Rosenthal et al. |
| 2019/0356051 | A1 | 11/2019 | Barrera et al. |
| 2020/0112101 | A1 | 4/2020 | Yun |
| 2020/0212948 | A1 | 7/2020 | Thill et al. |
| 2020/0243940 | A1 | 7/2020 | Greenstein et al. |
| 2020/0350664 | A1 | 11/2020 | Thill |
| 2020/0373668 | A1 | 11/2020 | Wu |
| 2020/0411972 | A1 | 12/2020 | Hicks et al. |
| 2021/0226316 | A1 | 7/2021 | Migliorino |
| 2021/0305718 | A1 | 9/2021 | Li |
| 2021/0391655 | A1 | 12/2021 | Brobston et al. |
| 2022/0384966 | A1 | 12/2022 | Chiang et al. |
| 2023/0052185 | A1 | 2/2023 | Thill |
| 2023/0055367 | A1* | 2/2023 | Neenan ................ H01Q 1/1207 |
| 2023/0145053 | A1 | 5/2023 | Kilbury et al. |
| 2023/0198553 | A1 | 6/2023 | Kim et al. |
| 2023/0223709 | A1 | 7/2023 | Guntupalli |
| 2023/0408619 | A1 | 12/2023 | El-Akkad et al. |
| 2024/0097339 | A1 | 3/2024 | Khatua |
| 2024/0113450 | A1 | 4/2024 | Neenan et al. |
| 2024/0113451 | A1 | 4/2024 | Neenan et al. |
| 2024/0128644 | A1 | 4/2024 | Neenan et al. |
| 2024/0304958 | A1 | 9/2024 | Matsumura |
| 2025/0079683 | A1 | 3/2025 | Neenan et al. |
| 2025/0079704 | A1 | 3/2025 | Neenan et al. |
| 2025/0087905 | A1 | 3/2025 | Neenan et al. |
| 2025/0105530 | A1 | 3/2025 | Neenan et al. |
| 2025/0158289 | A1 | 5/2025 | Neenan et al. |
| 2025/0167445 | A1 | 5/2025 | Neenan et al. |
| 2025/0167459 | A1 | 5/2025 | Neenan et al. |
| 2025/0233306 | A1 | 7/2025 | Neenan et al. |
| 2025/0233307 | A1 | 7/2025 | Neenan et al. |
| 2025/0260160 | A1 | 8/2025 | Neenan et al. |
| 2025/0329911 | A1 | 10/2025 | Neenan et al. |
| 2025/0329912 | A1 | 10/2025 | Neenan et al. |
| 2025/0329927 | A1 | 10/2025 | Neenan et al. |

FOREIGN PATENT DOCUMENTS

| | | |
|---|---|---|
| CN | 203562507 | 4/2014 |
| CN | 105281049 | 1/2016 |
| CN | 210806018 | 6/2020 |
| CN | 212303910 | 1/2021 |
| CN | 114465021 | 5/2022 |
| CN | 116151285 | 5/2023 |
| DE | 202017002307 U1 | 8/2017 |
| EP | 0 349 499 | 1/1990 |
| EP | 3 474 376 | 4/2019 |
| EP | 3 614 491 | 2/2020 |
| KR | 102260880 | 6/2021 |
| WO | WO 2005/062422 | 7/2005 |
| WO | WO 2013/090783 | 6/2013 |
| WO | WO 2018/140305 | 8/2018 |
| WO | WO 2020/010039 | 1/2020 |
| WO | WO 2023/128683 | 7/2023 |
| WO | WO 2024/035801 | 2/2024 |
| WO | WO 2024/035805 | 2/2024 |
| WO | WO 2024/035810 | 2/2024 |
| WO | WO 2025/072367 | 9/2024 |
| WO | WO 2025/072213 | 4/2025 |
| WO | WO 2025/072553 | 4/2025 |
| WO | WO 2025/221801 | 10/2025 |
| WO | WO 2025/226612 | 10/2025 |
| WO | WO 2025/226867 | 10/2025 |

* cited by examiner

ANTENNA SYSTEMS

INCORPORATION BY REFERENCE TO ANY PRIORITY APPLICATIONS

The present application claims priority benefit to U.S. Provisional Application No. 63/585,541, filed Sep. 26, 2023, entitled "ANTENNA SYSTEMS," which is hereby incorporated by reference herein in its entirety. Any and all applications for which a foreign or domestic priority claim is identified in the Application Data Sheet as filed with the present application are hereby incorporated by reference under 37 CFR 1.57 and made a part of this specification.

BACKGROUND

Field

The present disclosure relates to the field of wireless broadband communication, and more particularly to antenna systems and antennas that cover multiple frequency bands used in the telecommunication wireless spectrum.

Description of the Related Art

Over the last few decades, 3GPP as a collaborative organization has developed protocols for mobile telecommunications. The latest operational standard is known as 5G. Wireless communication relies on a variety of radio components including radio antennas that are used for transmitting and receiving information via electromagnetic waves. To communicate to specific devices without interference from other devices, radio transceivers and receivers communicate within a dedicated frequency bandwidth and have associated antennas that are configured to electromagnetically resonate at frequencies within the dedicated bandwidth. As more wireless devices are used on a frequency bandwidth, a communication bottleneck occurs as wireless devices compete for frequency channels within a dedicated bandwidth. 3GPP frequency bands range from 450 MHz to 8 GHz and beyond, however, antennas configured to resonate within this spectrum only resonate below 8 GHz for mobile 3GPP telecommunication standards. To capture a greater portion of the 3GPP or other telecommunication spectrum, either an antenna array of various antenna configurations is used, or a single geometrically complex antenna can be used. An antenna array, in most instances, takes up too much space and is therefore impractical for small devices, but employing a single antenna will have a useable bandwidth that is limited by its geometrical configuration. In one example, a known antenna configuration permits a 700 MHz-2.7 GHz frequency band; however, a single antenna configuration that permits a wider frequency band is desired. Additionally, it can be difficult and expensive to manufacture, assemble, and procure materials for components of antenna array systems. This may result in a system with poor functionality and/or coverage.

SUMMARY

This disclosure relates to antennas that cover multiple frequency bands that are prolific in today's telecommunication wireless spectrum. The advances of telecommunications wireless devices have expanded the number of frequency bands that a radio can support for prolific coverage. For example, there are over 30 LTE Bands that a radio may be asked to support if the radio is to provide ubiquitous coverage for a mobile device. While some of the LTE Bands overlap one another, there are numerous gaps between the bands as well. A multi-band approach to the antenna's frequency response provides a unique and novel radiating structure to support the numerous LTE bands.

According to some embodiments, a multi-band antenna including a radiating element is disclosed. The radiating element includes an upright portion, a head portion, one or more first arms, and one or more second arms. The upright portion is configured for low-band radiation. The head portion extends from a top edge of the upright portion and is configured for low-band radiation. The one or more first arms extend from the upright portion and configured for mid-band radiation. The one or more second arms extend from the upright portion and are configured for C-band radiation.

According to some embodiments, a multi-band antenna is disclosed. The multi-band antenna includes an upright portion, a head portion, a first left arm, a first right arm, a second left arm, and a second right arm. The upright portion is configured as a first resonating component. The head portion extends angularly from the upright portion and is configured as a second resonating component. The first left arm extends from a left edge of the upright portion and is configured as a third resonating component. The first right arm extends from a right edge of the upright portion and is configured as a fourth resonating component. The second left arm extends from the left edge of the upright portion and is configured as a fifth resonating component. The second right arm extends from the right edge of the upright portion and is configured as a sixth resonating component.

According to some embodiments, an antenna assembly is disclosed. The antenna assembly includes a base, a radome, and a multi-element multi-band antenna. The base includes a conductive material and is configured as a ground reference for the antenna assembly. The radome is configured to be coupled to the base to define an internal volume. The multi-element multi-band antenna includes one or more multi-band antennas coupled to the base and one or more second radiating elements coupled to the base.

Some advantageous features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present disclosure in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. Accordingly, the claims should be regarded as including such equivalent constructions in so far as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
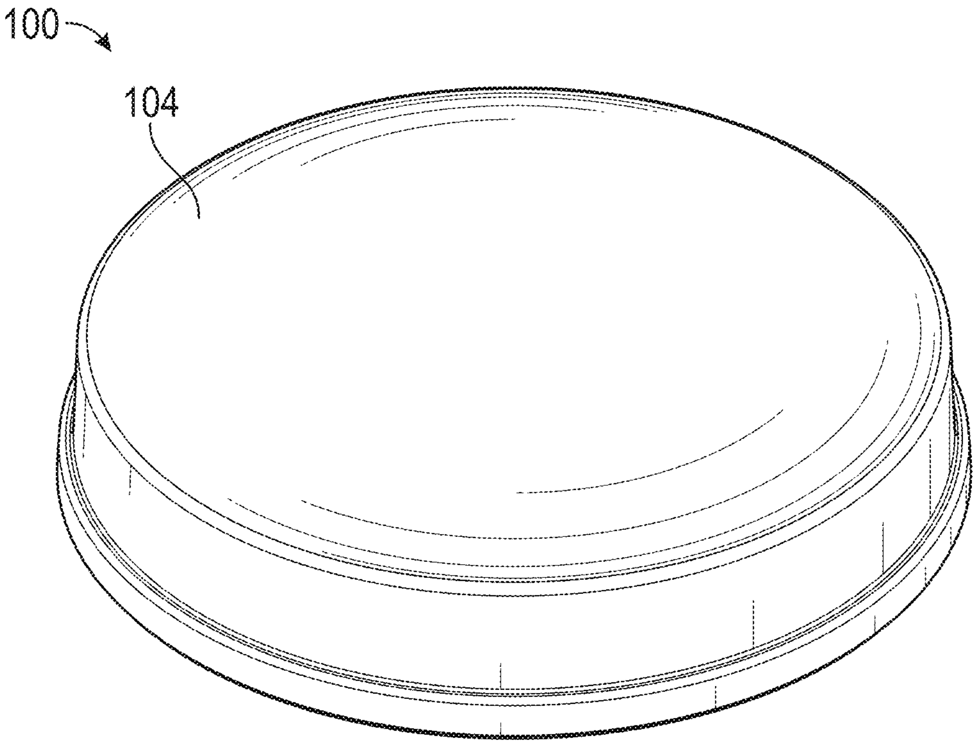
FIG. 1 illustrates a perspective view of an antenna system, in accordance with some aspects of this disclosure.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION

Illustrative embodiments of the preferred embodiments are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The systems and methods will be understood, both as to its structure and operation, from the accompanying drawings, taken in conjunction with the accompanying description. Several implementations of the system may be presented herein. It should be understood that various components, parts, and features of the different implementations may be combined together and/or interchanged with one another, all of which are within the scope of the present application, even though not all variations and particular implementations are shown in the drawings. It should also be understood that the mixing and matching of features, elements, and/or functions between various implementations is expressly contemplated herein so that one of ordinary skill in the art would appreciate from this disclosure that the features, elements, and/or functions of one implementation may be incorporated into another implementation as appropriate, unless otherwise described. As used herein, "system" and "assembly" are used interchangeably. It should be noted that the articles "a", "an", and "the", as used in this specification, include plural referents unless the content clearly dictates otherwise. Dimensions provided herein provide for an exemplary implementation, however, alternate implementations having scaled and proportional dimensions of the presented exemplary implementation are also considered. Additional features and functions are illustrated and discussed below.

Figure 6A:
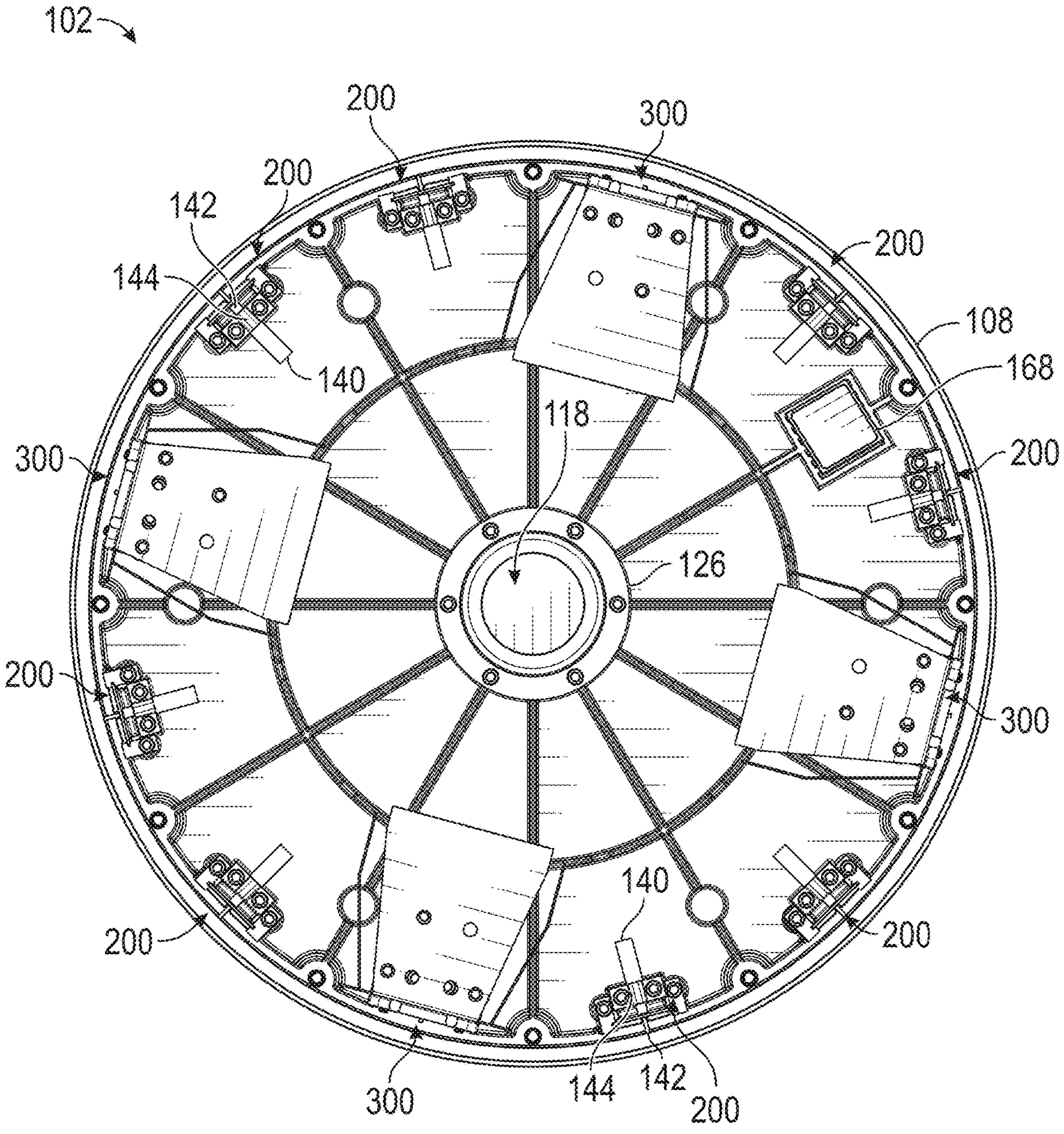
FIGS. 6A and 6B illustrate a top view and a perspective view respectively of the antenna system of FIG. 1 with the radome removed, in accordance with some aspects of this disclosure.
Figure 6B:
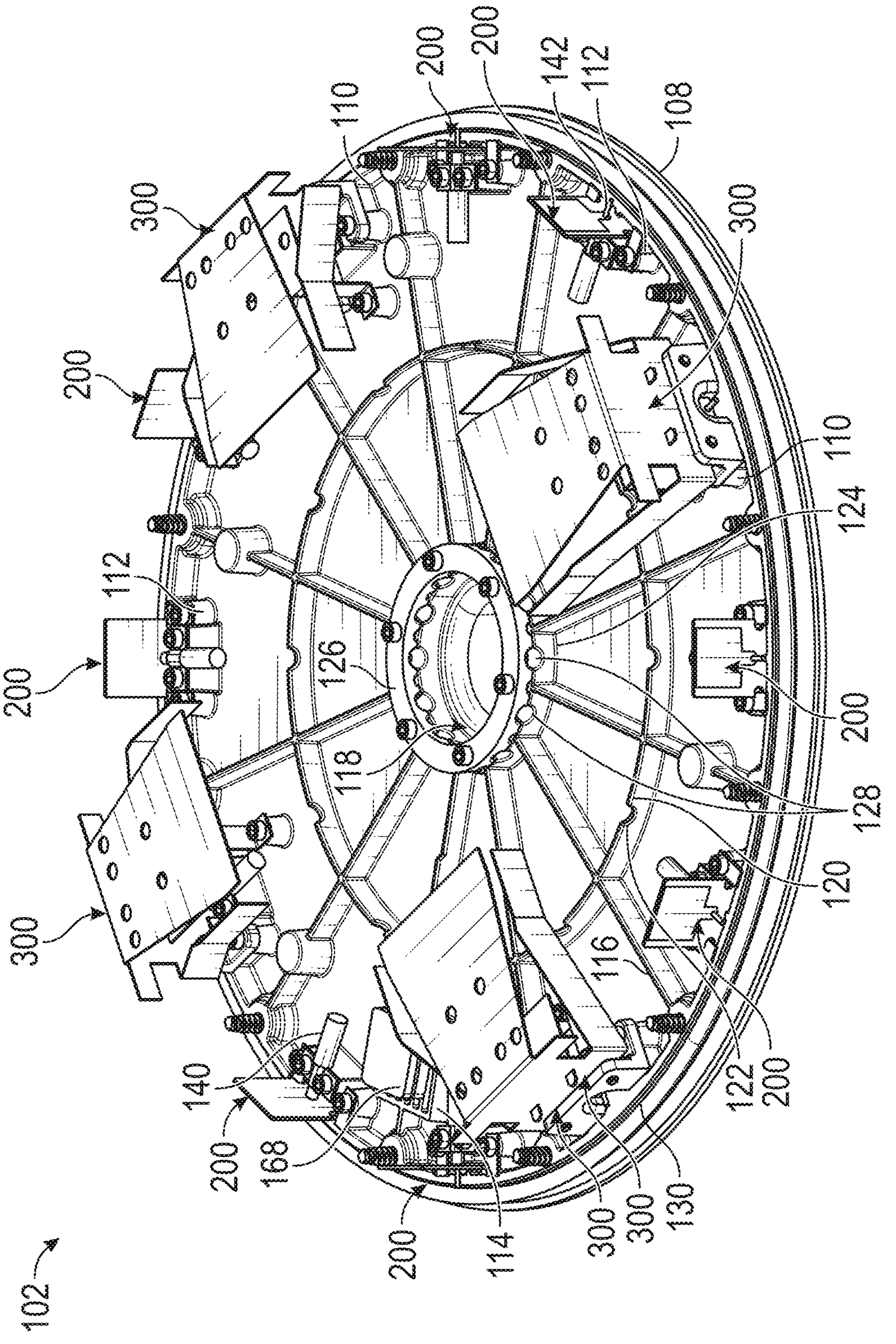
Figure 7A:
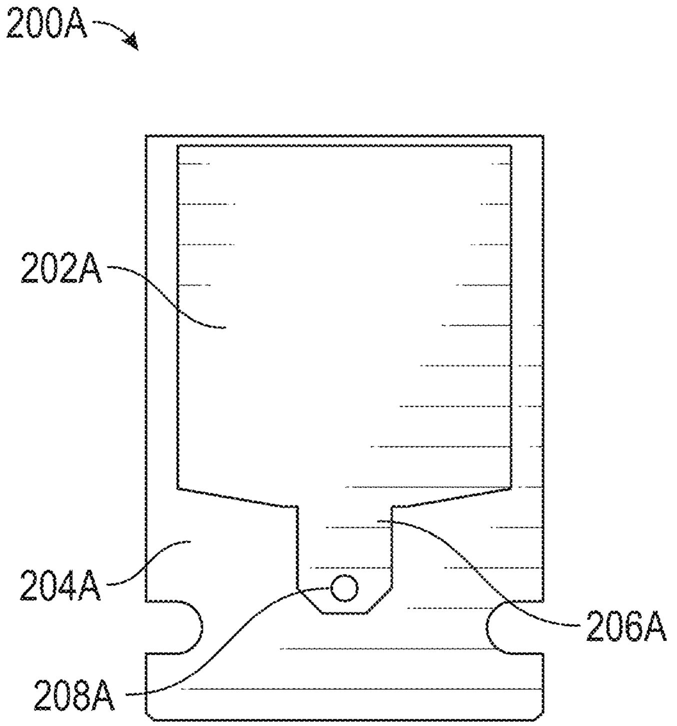
FIG. 7A illustrates a side view of a first implementation of a Wi-Fi radiating element of the antenna system of FIG. 1, in accordance with some aspects of this disclosure.
Figure 7B:
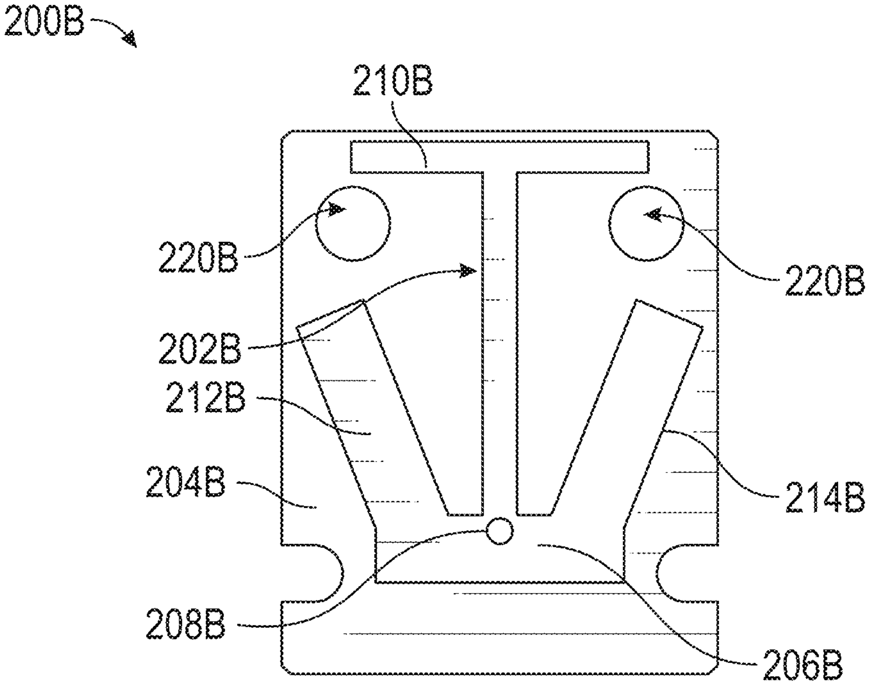
FIG. 7B illustrates a side view of a second implementation of a Wi-Fi radiating element of the antenna system of FIG. 1, in accordance with some aspects of this disclosure.

Referring now to the drawings wherein like reference characters identify corresponding or similar elements in form and function throughout the several views. FIGS. 1-4C illustrate various views of an exterior of an antenna assembly and mounting assemblies for the antenna assembly, FIGS. 5-6B illustrate various views of components of the antenna assembly in isolation and various internal views of the antenna assembly, FIGS. 7A and 7B illustrate various radiating elements that can be included in the antenna assembly, and FIGS. 8A-8H illustrate various views of components of a multi-band radiator portion that can be included in the antenna assembly.

According to some embodiments, features and aspects of this disclosure, a multi-band antenna including a radiating element is disclosed. The radiating element includes an upright portion, a head portion, one or more first arms, and one or more second arms. The upright portion is configured for low-band radiation. The head portion extends from a top edge of the upright portion and is configured for low-band radiation. The one or more first arms extend from the upright portion and configured for mid-band radiation. The one or more second arms extend from the upright portion and are configured for C-band radiation.

According to some embodiments, features and aspects of this disclosure, a multi-band antenna is disclosed. The multi-band antenna includes an upright portion, a head portion, a first left arm, a first right arm, a second left arm, and a second right arm. The upright portion is configured as a first resonating component. The head portion extends angularly from the upright portion and is configured as a second resonating component. The first left arm extends from a left edge of the upright portion and is configured as a third resonating component. The first right arm extends from a right edge of the upright portion and is configured as a fourth resonating component. The second left arm extends from the left edge of the upright portion and is configured as a fifth resonating component. The second right arm extends from the right edge of the upright portion and is configured as a sixth resonating component.

According to some embodiments, features and aspects of this disclosure, an antenna assembly is disclosed. The antenna assembly includes a base, a radome, and a multi-element multi-band antenna. The base includes a conductive material and is configured as a ground reference for the antenna assembly. The radome is configured to be coupled to the base to define an internal volume. The multi-element multi-band antenna includes one or more multi-band antennas coupled to the base and one or more second radiating elements coupled to the base.

The following detailed description of certain implementations presents various descriptions of specific implementations. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain implementations can include more elements than illustrated in a drawing and/or a subset of the elements illustrated in a drawing. Further, some implementations can incorporate any suitable combination of features from two or more drawings.

Objects that are coupled together can be permanently connected together or releasably connected together. Objects that are permanently connected together can be formed out of one sheet of material or multiple sheets of material. The type of connection can provide different means for the realization of particular advantages and/or convenience consistent with the suitable function and performance of the device.

With reference to FIG. 1, a perspective view of an antenna assembly 100 is illustrated in accordance with an implementation of the present disclosure. The antenna assembly 100 may include a multi-element multi-band antenna 102 (see e.g., FIG. 6B). The multi-element multi-band antenna 102 may be configured to provide wireless internet connectivity for a plurality of uses (e.g., data, voice communication, remote video monitoring, and/or the like). The multi-element multi-band antenna 102 can be configured to provide high performance of 5G frequencies for both mobile and enterprise network applications. The multi-element multi-band antenna 102 may have particular benefits when used with vehicles, however, the multi-element multi-band antenna 102 may be used in a wide range of applications. For example, the antenna assembly 100 can be durable such that the multi-element multi-band antenna 102 can perform at high efficiency on emergency vehicles (e.g., police vehicles, ambulances, firetrucks, etc.), construction fleets, enterprise roof mounts, recreational vehicles, and/or the like. The antenna assembly 100 can protect the multi-element multi-band antenna 102 even when deployed outdoors or in hard use situations. The multi-element multi-band antenna 102 may have a smaller volume and profile when compared to other antenna systems. For example, the antenna assembly 100 may have a cubic volume of less than 210 cubic inches.

The components of the multi-element multi-band antenna 102 may be concealed and/or secured within and/or between a radome 104 (also referred to herein as "cover" 104 and "non-conducive cover" 104) and a base 108. As shown and described further with reference to at least FIGS. 6A-8H, the multi-element multi-band antenna 102 may include one or more of the following: one or more first radiating element(s) 300, one or more second radiating element(s) 200, and/or one or more GPS antenna(s) 168. In some implementations, the multi-element multi-band antenna 102 can include radiating elements 200, 300 configured to radiate at specific frequency bands. For example, the radiating elements 200, 300 can be configured for one or more of: low-band operation (approximately 600 MHZ to 900 MHZ), mid-band operation (approximately 1.7 GHZ to 2.7 GHZ), CBRS-band ("C-band") operation (approximately 3.4 GHz to 4.2 GHZ), and/or high-band Wi-Fi-band ("Wi-Fi-band) operation (approximately 4.8 GHz to 7.25 GHZ), depending on the desired performance of the antenna assembly. In some implementations, a plurality of fasteners can be used to secure the components of the antenna assembly 100 together and can include fasteners, magnets, and/or the like.

Figure 2:
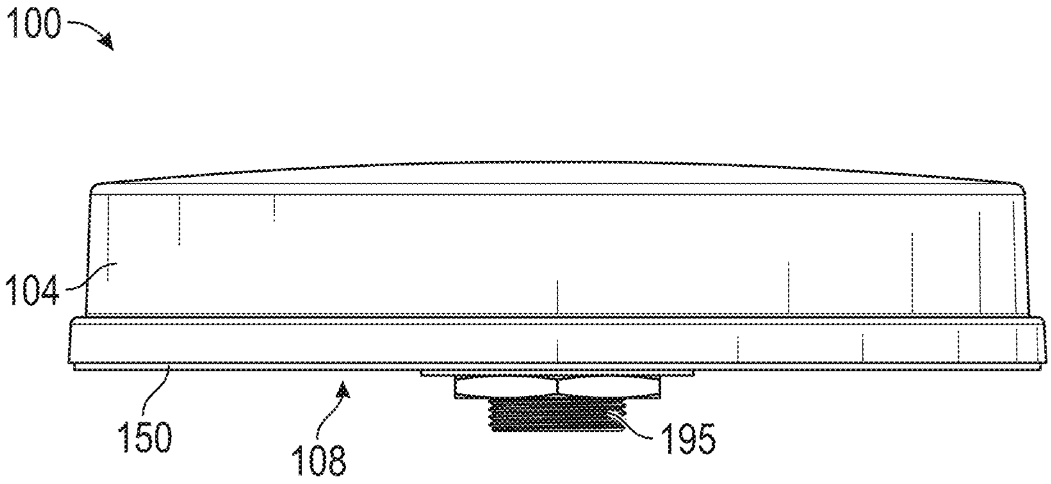
FIG. 2 illustrates a side view of the antenna system of FIG. 1, in accordance with some aspects of this disclosure.
Figure 3:
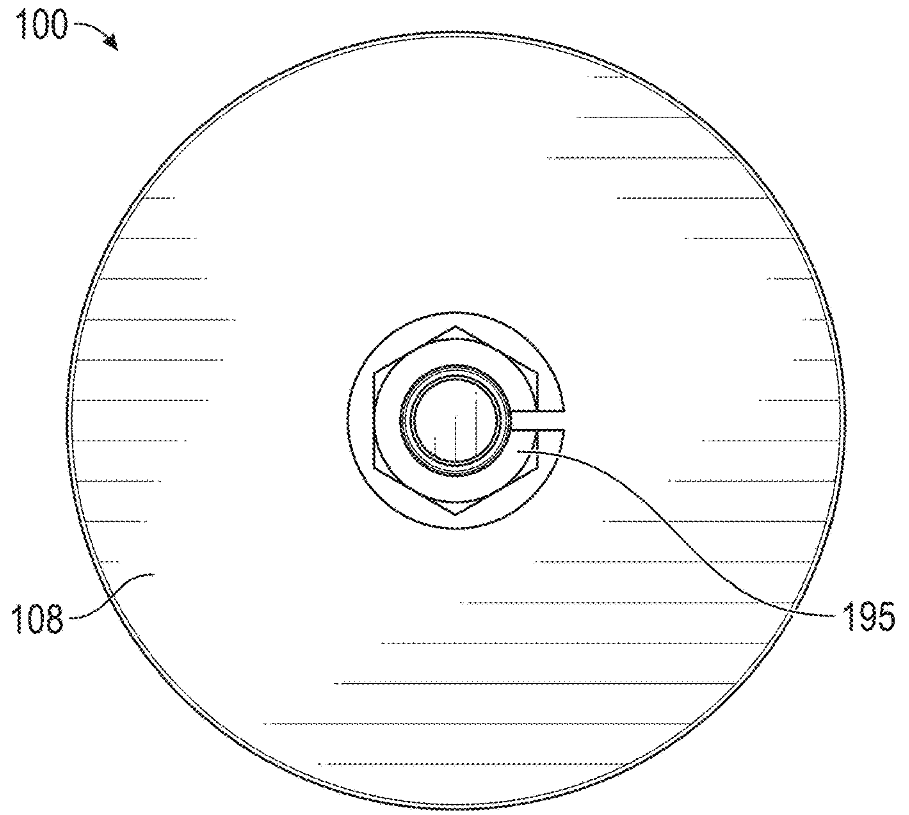
FIG. 3 illustrates a bottom view of the antenna system of FIG. 1, in accordance with some aspects of this disclosure.

With reference to FIGS. 1-3, the radome 104 may protect and/or provide mechanical support for the multi-element multi-band antenna 102. For example, the multi-element multi-band antenna 102 can be enveloped by the radome 104. The radome 104 may be transparent to radiation from the multi-element multi-band antenna 102 and may serve as an environmental shield for the internal components of the antenna assembly 100, including the multi-element multi-band antenna 102. The radome 104 may be made of a non-conductive material. The radome 104 may be generally cylindrical or circular prism shaped, with an open bottom, in some configurations. Other suitable shapes can be used for the radome 104. The radome 104 can be configured to be removably coupled to the base 108. In some cases, the shape of the radome 104 can be selected based on the expected operating conditions for the antenna assembly 100. For example, the expected wind-load on the antenna assembly 100 when in use (e.g., when mounted to a vehicle) can impact the design of the radome 104. In some cases, the antenna assembly 100 may be deployed on a vehicle, as described above. Accordingly, it can be desirable for the antenna assembly 100, and the radome 104 in particular, to have a low profile design. In some implementations, the antenna assembly 100 may have a total height of less than 3 inches (e.g., less than 3 inches, less than 2.75 inches, less than 2.5 inches, etc.) when measured from the base 108 to the top of the radome 104. In some implementations, the curved side wall(s) of the radome 104 can reduce the drag on the antenna assembly 100 when the antenna assembly 100 is deployed. In some implementations, the base 108 can be received within the radome 104 in the assembled antenna assembly 100, such that the base 108 or only a portion of the base 108 is visible from a side view of the antenna assembly 100. This design can minimize exposed edges and sharp transitions or protrusions between the base 108 and the radome 104. As a result, the antenna assembly 100 can have streamlined contours, which can reduce drag by minimizing turbulent airflow around the antenna assembly 100. Reducing drag can be particularly beneficial when operating in high wind-load conditions, such as on an emergency vehicle.

Figure 5:
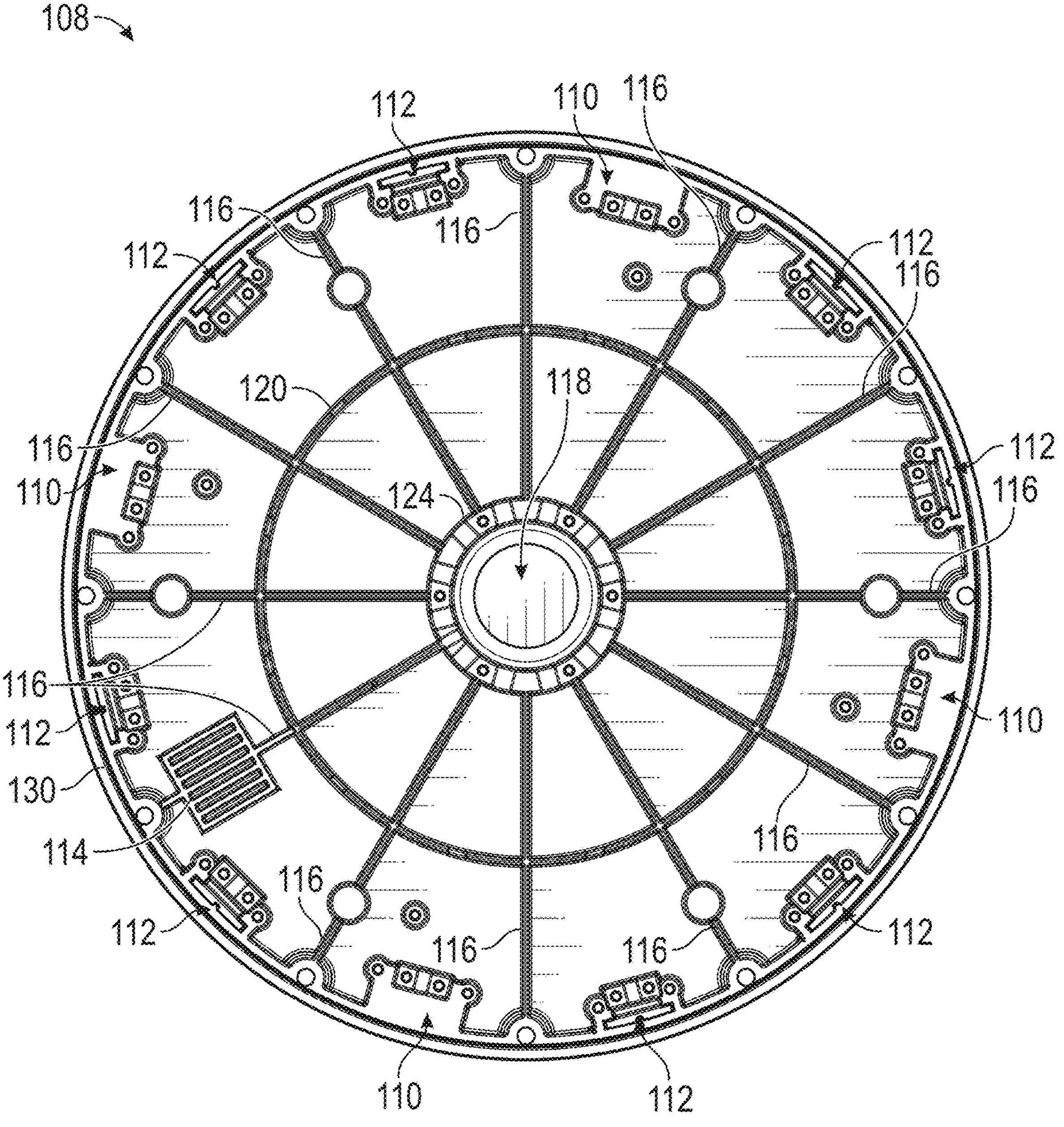
FIG. 5 illustrates a top isolation view of a base of the antenna system of FIG. 1, in accordance with some aspects of this disclosure.

FIG. 5 shows a top view of the base 108 of the antenna assembly 100 in isolation. FIGS. 6A and 6B show a top view and a top perspective view respectfully of the base 108 and the multi-element multi-band antenna 102 with the radome 104 not shown. As shown in FIG. 5, the base 108 can provide mechanical support for the multi-element multi-band antenna 102. The base 108 can also serve as the ground plane for the antenna assembly 100. For example, the base 108 can be electrically conductive. The base 108 can be made of a conductive material, such as a metal (e.g., aluminum). In some embodiments, the base 108 can provide an electrical connection with a client ground plane. In some implementations, the base 108 includes a plurality of small gaps (not shown) in the surface of the base 108, which may facilitate the use of non-conductive weather resistant material. In some implementations, the size and proximity of the base 108 may be selected to provide an electromagnetic connection with the client ground plane. The combination of at least the non-conductive radome 104 and the conductive base 108 provide mechanical and environmental protection for the multi-element multi-band antenna 102 as well as grounding for the electrically active, radiating portions of the multi-element multi-band antenna 102 that are internal to the antenna assembly 100.

As shown in FIGS. 1-3, the radome 104 can be positioned on the base 108 to secure the internal components of the antenna assembly 100, including the multi-element multi-band antenna 102. The radome 104 may include a plurality of fastener holes which may extend up the side walls of the radome 104. In some implementations, the fastener holes may be tapered. In some implementations, the fastener holes may be threaded. These plurality of fastener holes may be aligned with fastener holes of the base 108 in the assembled configuration, and fasteners can be positioned within the holes to secure the radome 104 and the internal components of the multi-element multi-band antenna 102 to the base 108. In some implementations, the assembled antenna assembly 100 may have an approximate diameter of about 10.75 inches and a height of about 2.31 inches. This small profile, particularly the small diameter and height, can significantly improve the aerodynamic properties of the antenna assembly 100 when in operation.

Referring back to FIG. 5, the base 108 (also referred to herein as the “ground reference” or “ground plane”), is shown in isolation. The base 108 may serve as the ground reference for at least one or more of the radiating elements described herein (e.g., the first radiating element(s) 300, the second radiating element(s) 200, and/or the GPS antenna(s) 168). The radiating elements (e.g., the first radiating element(s) 300 and the second radiating element(s) 200) may also be referred to herein as “radiating antenna elements”, “antenna elements”, “radiating portions”, “radiator portions”, or “multi-band antennas”. The base 108 can include one or more mounting portions for supporting the radiating elements of the multi-element multi-band antenna 102. For example, the base 108 can include one or more first mounting portions 110 configured to support the radiating element(s) 300 and one or more second mounting portions 112 configured to support the second radiating element(s) 200. In the illustrated example, the base 108 is configured to support up to four first radiating elements 300 and up to eight second radiating elements 200. Accordingly, the base 108 includes four first mounting portions 110 and eight second mounting portions 112. In other implementations, more or less radiating elements 200, 300 can be included in the multi-element multi-band antenna 102 and the base 108 can include a same number of mounting portions 110, 112. Alternatively, the multi-element multi-band antenna 102 can be assembled without including the maximum number of radiating elements 200, 300. As shown in FIG. 5, the base 108 may also include a GPS mounting portion 114. In the assembled antenna assembly 100, the GPS antenna 168 can be positioned on and/or coupled to the GPS mounting portion 114. In some implementations, an adhesive or adhesive pad can be used to secure the GPS antenna 168 to the GPS mounting portion 114.

The mounting portions 110, 112 can be distributed around the perimeter of the base 108. In the illustrated example, each first mounting portion 110 is positioned between two pairs of second mounting portions 112. For example, when the maximum number of radiating elements 200, 300 are included in the multi-element multi-band antenna 102, each first radiating element 300 can have two second radiating elements 200 positioned on each side of the first radiating element 300. Such an arrangement can provide separation between the first radiating elements 300, which can reduce mutual coupling and enhance realized antenna gain.

The base 108 can include a central opening 118. The central opening 118 can extend completely through the base 108 (e.g., from the top side to the bottom side). The central opening 118 can allow coaxial cables of the antenna assembly 100 to be routed from the radiating elements of the multi-element multi-band antenna 102 through the central opening 118 to one or more transmitters/receivers of the antenna assembly 100. As shown in FIG. 5, the base 108 can include a lower cable support portion 124 that surrounds the central opening 118. The lower cable support portion 124 can be configured to be coupled with an upper cable support portion 126 (see e.g., FIGS. 6A and 6B) to secure the coaxial cables to the base 108. For example, the upper cable support portion 126 can be coupled to the lower cable support portion 124 using one or more fasteners. As shown in FIG. 6B, the cable support portions 124, 126 can define a plurality of openings 128. Each opening 128 can receive a coaxial cable of the antenna assembly 100 and can assist in cable management within the antenna assembly 100.

In the illustrated example, the base 108 includes a plurality of ribs 116. The ribs 116 extend outwardly from the lower cable support portion 124 towards a rim 130 of the base 108. The ribs 116 can provide a benefit of increasing the mechanical stiffness of the base 108 while minimizing the additional material required for the base 108. For example, additional material can increase the weight and cost of the of the base 108, which may not be desirable. Accordingly, including the ribs 116 is an efficient way to both reduce the cost and weight of the antenna assembly 100. The rim 130 can provide a barrier between the center of the base 108. The rim 130 can extend upwardly from an inner surface of the base 108. In some implementations, a gasket (e.g., an O-ring) can be secured around an outer periphery of the rim 130 to prevent ingress (e.g., water, dust, etc.) into the internal volume of the antenna assembly 100. For example, when the radome 104 is coupled to the base 108, the gasket (not shown) can create a seal or barrier to fluid ingress. As such, the antenna assembly 100 may be IP67 rated and the antenna assembly 100 may be able to operate in wet conditions (e.g., in the rain).

The base 108 may also include an inner rib 120. The inner rib 120 may be circular and may be positioned between the lower cable support portion 124 and the rim 130. The inner rib 120 can include a plurality of cable grooves 122 (see e.g., FIG. 6B) that can support the coaxial cables. In such an arrangement, the coaxial cables can be suspended above the inner surface of the base 108. For ease of illustration, only on cable groove 122 is labeled in FIG. 6B.

Referring back to FIGS. 6A and 6B, the multi-element multi-band antenna 102 can include one or more first radiating element(s) 300. The first radiating elements can be multi-band radiator portions 300 and can be used for wireless telecommunication purposes (e.g., cellular telecommunication). Each multi-band radiator portion 300 may be a dual-band monopole antenna, a multi-band 3D inverted F antenna, or a version of a 2D inverted F antenna similar to a PIFA, that has a configuration that, when used in conjunction with high order electromagnetic modes generated or received by a transceiver and/or receiver, permit the antenna to have an operating frequency range of 600 MHZ to 7.25 GHz. Depending on the particular use, the number of multi-band radiator portions 300 can vary. In the illustrated example, the antenna assembly 100 includes four multi-band radiator portions 300; however, more or less multi-band radiator portions 300 are possible. The multi-band radiator portions 300 are described further herein with reference to FIGS. 8A-8H. The circular base 108 can promote isolation between the multi-band radiator portions 300. In some implementations, the diameter of the base 108 can be selected for the desired isolation between the multi-band radiator portions 300.

The multi-element multi-band antenna 102 can optionally include one or more GPS antennas 168. In the illustrated example, the multi-element multi-band antenna 102 includes a single GPS antenna 168 (also referred to herein as a "GPS radiating device"). The GPS radiating portion 168 can be used to collect signal(s) from geosynchronous satellites so that the GPS function of a radio including the multi-element multi-band antenna 102 can determine where the multi-element multi-band antenna 102 is positioned relative to a global coordinate system. The GPS antenna 168 may be positioned within the radome 104 and may be mounted to the GPS mounting portion 114. The GPS antenna 168 may be electrically and/or mechanically coupled to the base 108.

The multi-element multi-band antenna 102 can include one or more second radiating elements 200. The second radiating elements can be configured operation at frequencies above approximately 1 GHz, in some implementations. For example, the second radiating elements 200 can be configured as multi-band Wi-Fi radios, 3GPP radios, cellular radios, and/or the like. In some advantageous embodiments, the second radiating elements 200 can be multi-band WiFi antenna devices. As such, the second radiating elements 200 can be configured for mid-band operation, CBRS-band operation, and Wi-Fi-band operation, depending on the specific radio or transceiver attached. In some cases, the radiating portion 121 can have an operating range of approximately 1.6 GHz to 8 GHz or higher. As described further below, second radiating elements can include one or more PCB portions. The PCB portions may be made of flexible substrate materials (e.g., polyimide). As such, the PCB portions may be a flex circuit. In some cases, the PCB portions may be fiberglass reinforced with epoxy (e.g., FR4). The PCB portions may provide structure for the radiating portions of the second radiating elements 200. The various conductive portions of the second radiating elements 200 may be etched into the structure of the PCB portions.

FIG. 7A illustrates a first example of a second radiating element 200A in isolation. FIG. 7B illustrates a second example of a second radiating element 200B in isolation. The antenna assembly 100 can include second radiating elements 200A, second radiating elements 200B, or a combination of both, depending on the configuration. While FIGS. 6A and 6B show the antenna assembly 100 with the second radiating elements 200A, it is recognized that the antenna assembly 100 could include the second radiating elements 200B in addition to or alternatively to the second radiating elements 200A.

Referring to FIG. 7A first, the second radiating element 200A can include a conductive portion 202A formed on a PCB portion 204A. The conductive portion 202A can have a generally rectangular shape. The conductive portion 202A can extend from a feed point 206A. The feed point 206A is the location in the second radiating element 200A where the radio frequency (RF) signal is applied to or extracted from the second radiating element 200A. The conductive portion 202A may taper at its lower end towards the feed point 206A. The feeding portion 206A can include a coaxial input 208A. The coaxial input 208A can be configured to receive the center conductor 142 of coaxial cables of the antenna assembly 100. In some cases, the center conductor 142 can be soldered to the coaxial input 208A, which results in the second radiating element 200A being electrically coupled to the coaxial cable.

The second radiating element 200A can advantageously be configured to work with a multitude of radios configured to operate above approximately 1 GHz. For example, if the operator of the antenna assembly 100 desires additional cellular radios above 1 GHz, the second radiating elements 200A can be utilized. The second radiating element 200A may have optimal electrical properties from approximately 1.6 GHz to 8 GHz when used with the base 108, as in the antenna assembly 100.

Referring now to FIG. 7B, the second radiating element 200B can include a conductive portion 202B formed on PCB portion 204B. The conductive portion 202B can include a central conductive portion 210B and a first arm 212B and a second arm 214B, all etched into the PCB portion 204B. The central conductive portion 210B can be generally T-shaped. In some implementations, the second radiating element 200B can be configured for mid-band and Wi-Fi-band operation. In some cases, the central conductive portion 210B can be used for the 2.4 GHz to 2.5 GHz portion of the mid-band. In some cases, the first arm 212B and the second arm 214B can be used to cover the 4.8 GHz to 7.25 GHz of the Wi-Fi-band. In some cases, the height and width of the central element of the central conductive portion 210B (e.g., between the two arms of the "T") can be selected for the impedance matching of the two bands. The conductive portion 202B can extend from a feed point 206B. The feeding portion 206B can include a coaxial input 208B. The coaxial input 208A can be configured to receive the center conductor 142 of coaxial cables of the antenna assembly 100. In some implementations, the PCB portion 204B can include one or more holes 220B. The holes 220B can extend through the PCB portion 204B without contacting the conductive portion 202B. The holes 220B can be tooling holes utilized when manufacturing the PCB portion 204B and are not required. For example, the holes 220B do not impact the electrical performance of the second radiating element 200B.

As shown in FIGS. 6A and 6B, each radiating element 200, 300 can be connected to a terminated coaxial cable 140. The coaxial cables are the transmission lines that allow for the radio frequency "RF" signal to travel from the output of the radio used to establish the wireless link from the base station to the mobile radio of the users of the wireless network. The terminated coaxial cables 140 may require proper connection to the particular components of the multi-element multi-band antenna 102 so that it can function properly. The terminated coaxial cables 140 may each include a center conductor 142 positioned within an outer conductor 144. The outer conductors 144 can be mechanically and electrically connected to the base 108. For example, the outer conductor 144 can be positioned in cable grooves in the mounting portions 110, 112 and coupled to the base 108 at the mounting portions 110, 112 using a bracket.

The number of coaxial cables included in the multi-element multi-band antenna 102 can be determined by the number of radiating elements included in the multi-element multi-band antenna 102. In the illustrated example, the multi-element multi-band antenna 102 includes thirteen radiating portions (e.g., four first radiating elements 300, eight second radiating elements 200, and the GPS antenna 168). As such, the multi-element multi-band antenna 102 includes thirteen coaxial cables, with thirteen terminated coaxial cables 140 being shown. For illustrative purposes, not all of the terminated coaxial cables 140 are labeled.

With reference again to FIG. 2, the base 108 can include a coupling portion 195. The coupling portion 195 can include a threading. The coupling portion 195 can be a shaft with an opening extending through the coupling portion 195. The coupling portion 195 can extend from a bottom of the base 108 so that the coupling portion 195 aligns with the central opening 118. In some implementations, the coupling portion 195 and the base 108 may be integrally formed. A waster, a nut (e.g., a hex nut), and/or any other fastener can be coupled to the threading of the coupling portion 195 to secure the antenna assembly 100 to a deployment surface. For example, the coupling portion 195 can be used to attach the antenna assembly 100 to a vehicle, a roof, any other structure, etc. In some implementations, the antenna assembly 100 can be attached to a client ground plane. In some implementations, a gasket 150 (see e.g., FIG. 2) may be coupled to the bottom surface of the base 108 before the antenna assembly 100 is deployed. A gasket 150 can help prevent fluid ingress into the internal volume of the antenna assembly 100 and/or can provide separation between the base 108 and the deployment surface. The gasket 150 on the base 108 can also increase the traction between the base 108 and the deployment surface.

Figure 4A:
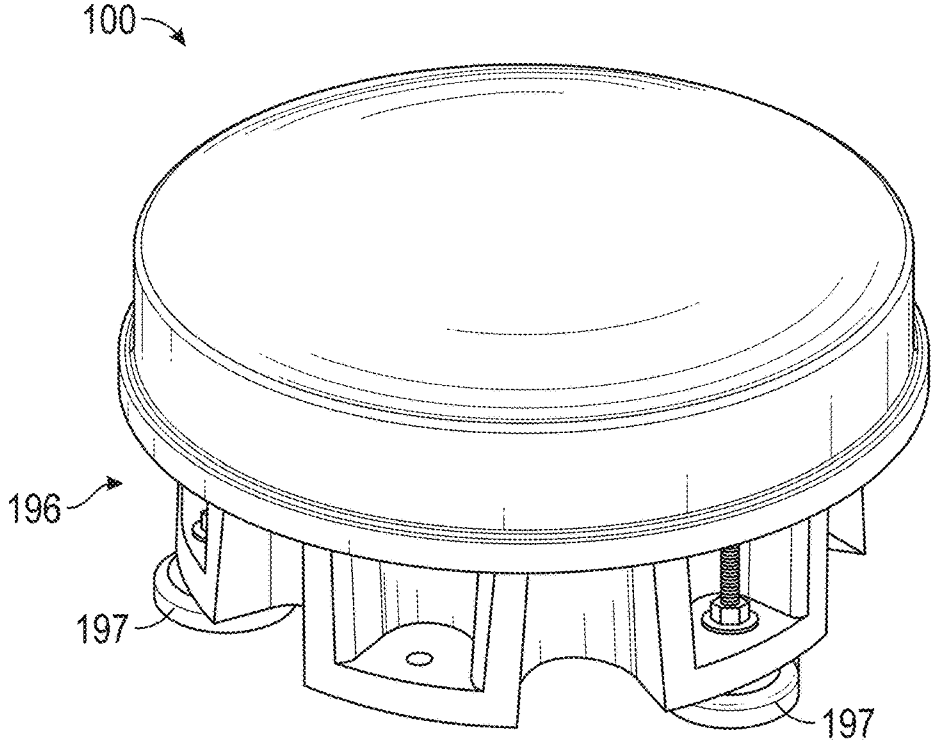
FIG. 4A illustrates a perspective view the antenna system of FIG. 1 with a first mounting assembly, in accordance with some aspects of this disclosure.

FIG. 4A illustrates the antenna assembly 100 with a magnetic coupling portion 196. The magnetic coupling portion 196 can include magnets 197 positioned at the bottom of the magnetic coupling portion 196. The magnetic coupling portion 196 may be coupled to the base 108 via one or more fasteners. In some implementations, the coupling portion 195 can be used to couple the antenna assembly 100 to the magnetic coupling portion 196. In some implementations, the magnets 197 can be threadedly coupled to the magnetic coupling portion 196. Accordingly, the magnets 197 can be rotated to move the magnets 197 in a direction towards and/or away from the base 108 so one or more of the magnets 197 are positioned a different distance from the base 108 than the rest of the magnets 197 to allow the antenna assembly 100 or the magnetic coupling portion 196 to be coupled to a curved deployment surface.

Figure 4B:
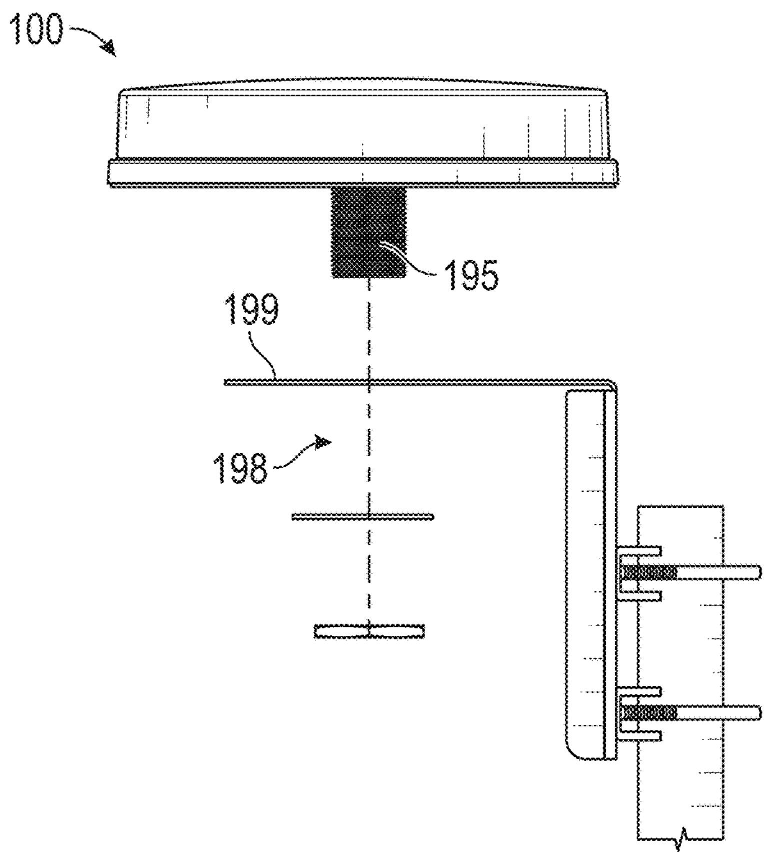
FIGS. 4B and 4C illustrates side views of the antenna system of FIG. 1 with a second mounting assembly, in accordance with some aspects of this disclosure.
Figure 4C:
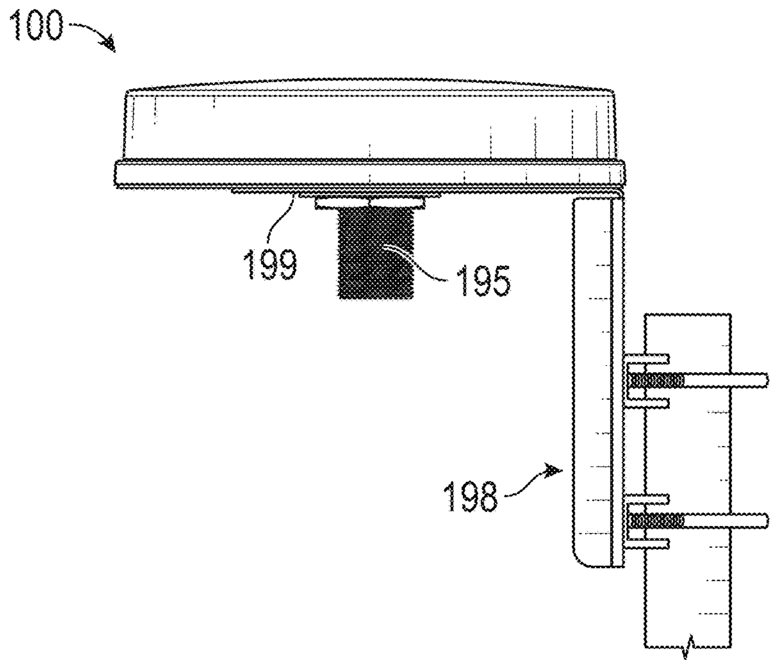

FIGS. 4B and 4C illustrate the antenna assembly 100 with a mounting bracket 198. The mounting bracket 198 may be removably coupled to a pole and/or any other elongated structure. The mounting bracket 198 may include a mounting plane 199 that includes an opening. The antenna assembly 100 may be coupled to the mounting plane 199 so the coupling portion 195 extends through the opening in the mounting plane 199. A waster, a nut (e.g., a hex nut), and/or any other fastener can be coupled to the threading of the coupling portion 195 to secure the multi-element multi-band antenna 102 to the mounting plane 199.

Figure 8A:
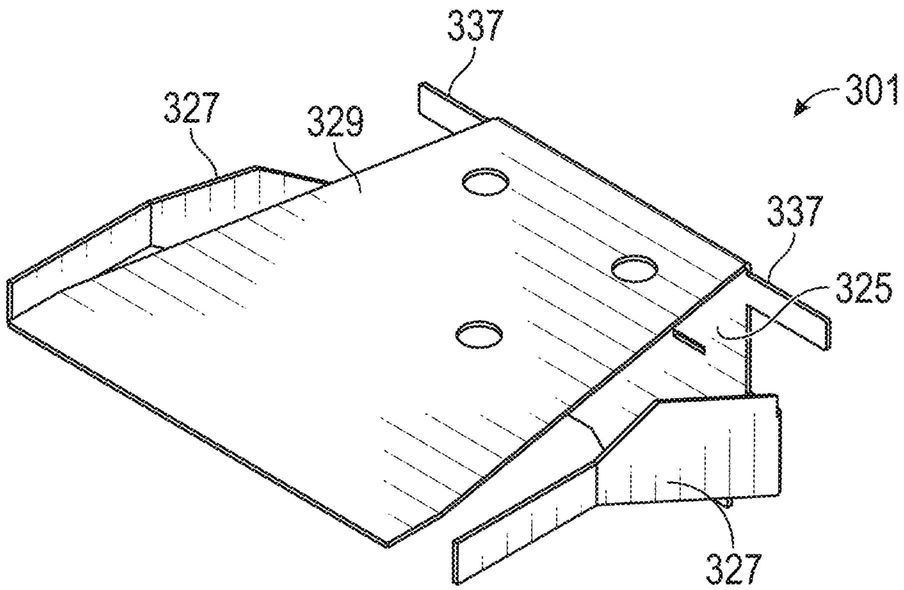
FIGS. 8A-8H illustrate various views of components of a multi-band radiator portion of the antenna assembly of FIG. 1, in accordance with some aspects of this disclosure.
Figure 8B:
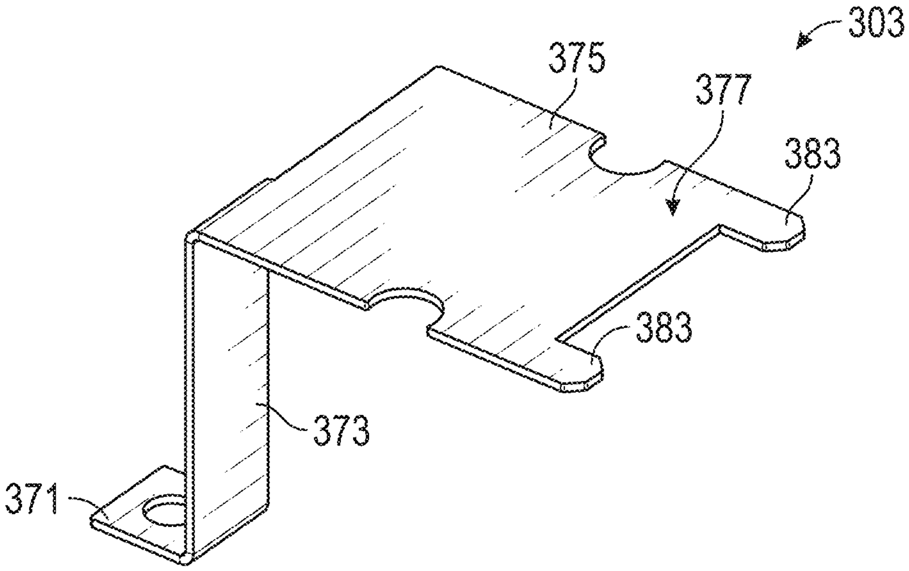
Figure 8C:
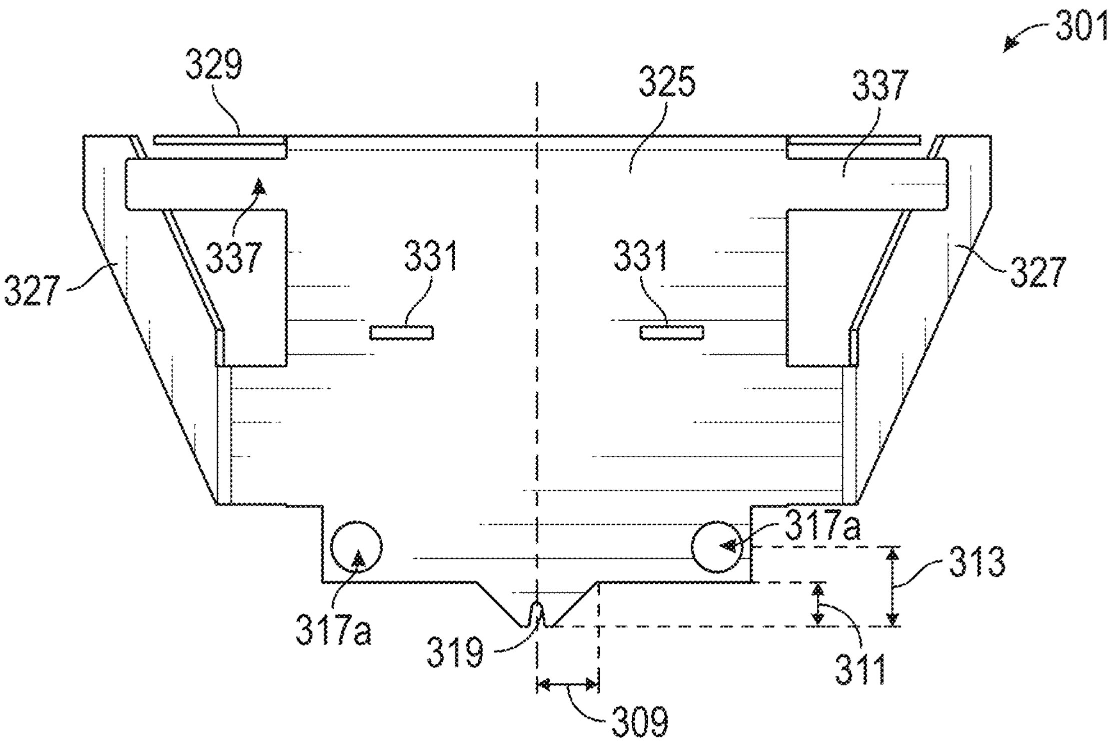
Figure 8D:
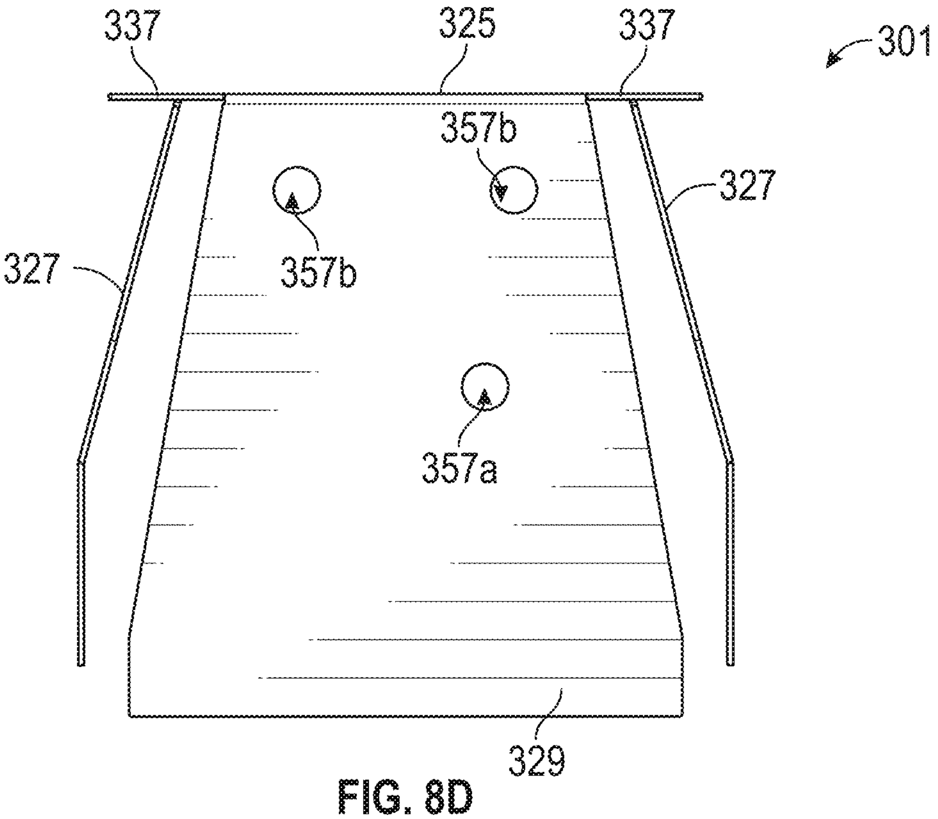
Figure 8E:
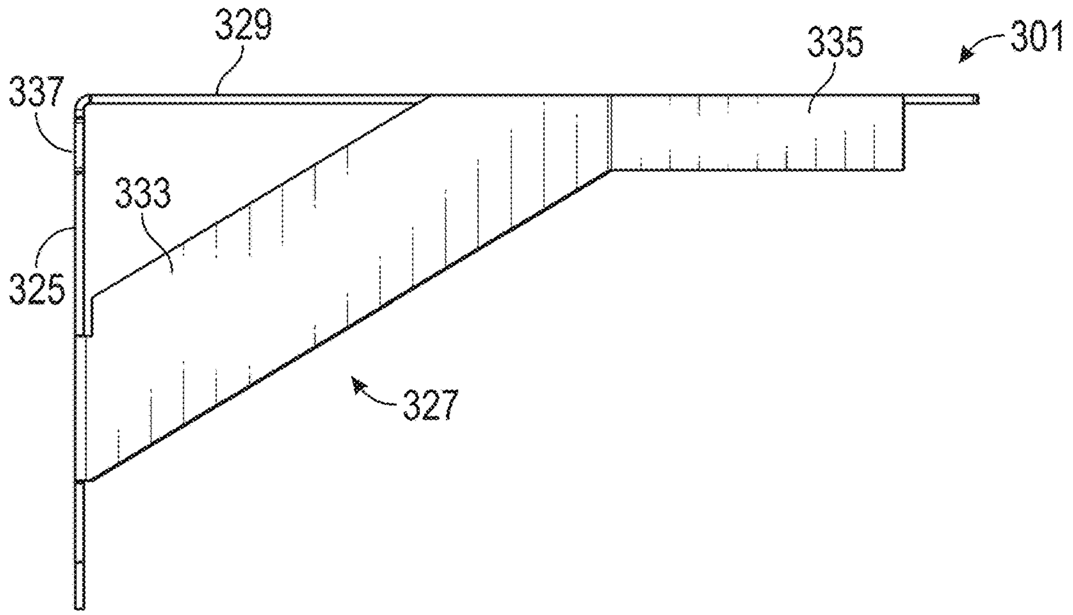
Figure 8F:
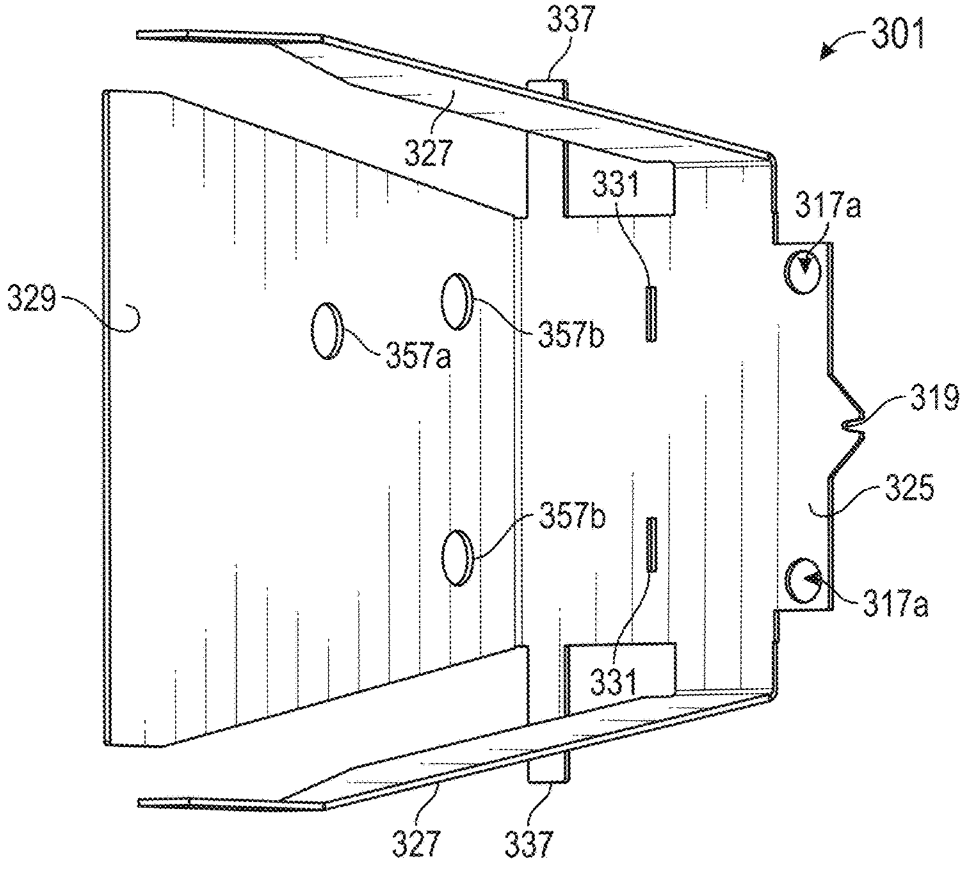
Figure 8G:
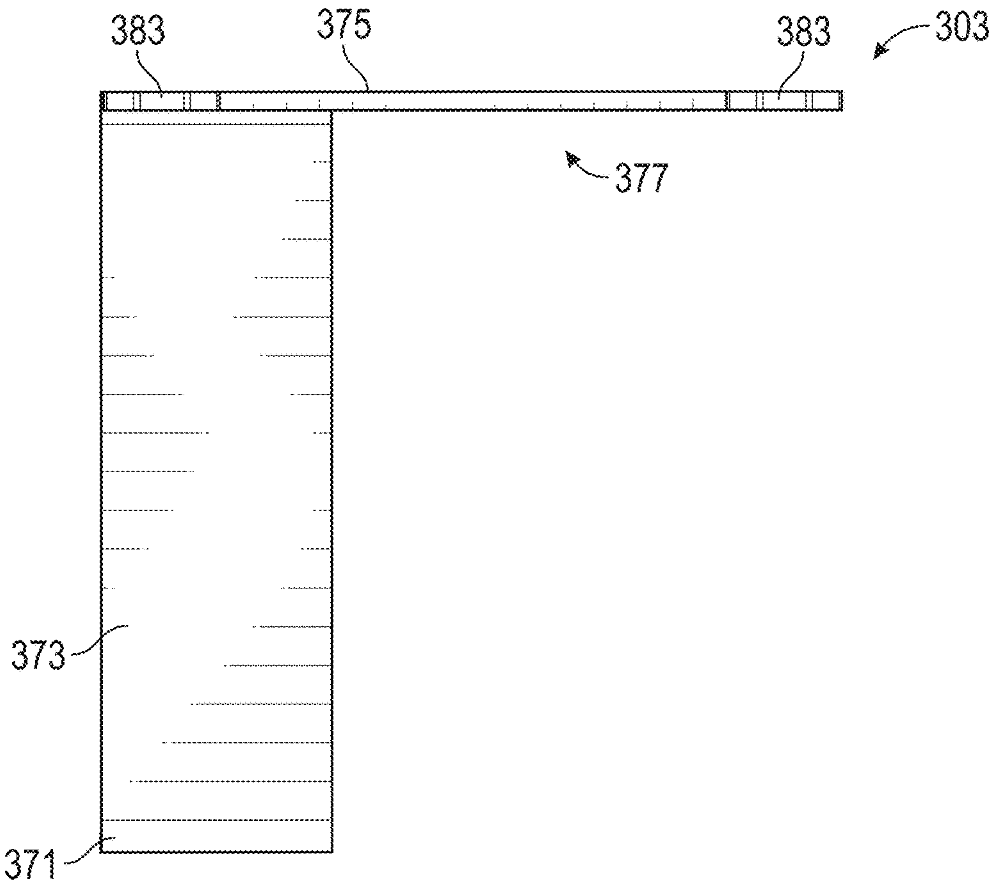
Figure 8H:
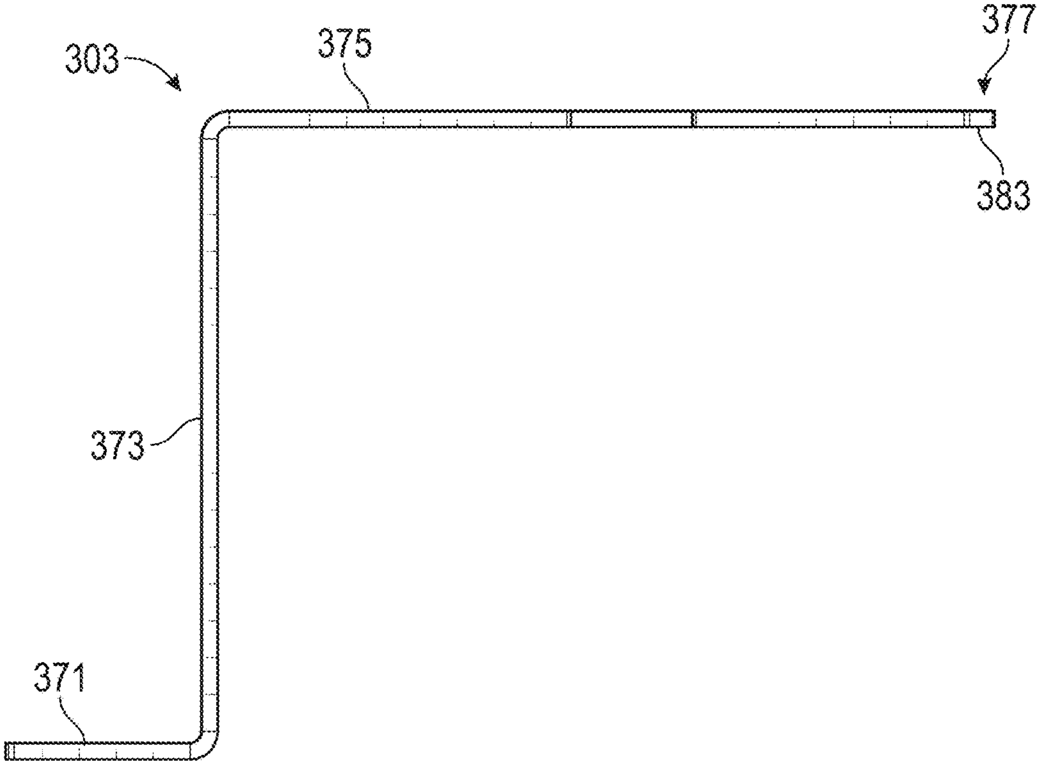

FIGS. 8A-8H illustrate various views of components of the multi-band radiator portions 300, in accordance with some aspects of this disclosure. Each multi-band radiator portion 300 can include a multi-band radiating element 301 and a ground connection 303 (also referred to herein as a "grounding portion"). The ground connection 303 is configured to couple multi-band radiating element 301 to the base 108. FIGS. 8A and 8C-8F illustrate assorted views of the multi-band radiating element 301. FIGS. 8B and 8G-8H illustrate the ground connection 303. It is recognized that the multi-band radiator portions 300 described herein are just one example of multi-band radiator portions that can be included in the antenna assembly 100. In the illustrated implementation, the radiating element 301 and the ground connection 303 are constructed of metal (e.g., a conductive sheet). In some cases, the conductive sheet can have a thickness between 0.01 inches and 0.03 inches. In other implementations, the radiating element 301 and/or ground connection 303 could be constructed out of several rigid PCB portions or a single flex circuit PCB (e.g., supported by the radome 104 or another RF-transparent supporting structure).

As shown in FIG. 8A, a radiating element 301 can be one element or component of the multi-band radiator portion 300. An upright low-band radiation portion 325 (also referred to herein as the "body portion 325") can be a body portion of the radiating element 301. The upright low-band radiation portion 325 can be coupled to a feeding portion at a feed point 319 (see e.g., FIG. 8C) to electrically excite the radiating element 301. As shown in FIG. 8A, a second low-band radiation portion 329 (also referred to herein as the "head portion 329") can be positioned at an angle relative to the body portion 325 (e.g., the upright low-band radiation portion 325) and extend such that the second low-band radiation portion 329 is not coplanar with the upright low-band radiation portion 325. In some other implementations, the second low-band radiation portion 329 can be configured without a bend such that it is coplanar with the upright low-band radiation portion 325. In some implementations, advantages of a bend can include having two distinct low-band radiating portions, reducing the total height of the system to be more compact and conserve space, and configuring the system to be able to easily cover and provide protection for the system in a compact configuration with multi-band coverage (e.g., in the antenna assembly 100). Having a compact radiating element 301 (e.g., in part due to the bend between the upright low-band radiation portion 325 and the second low-band radiation portion 329) can allow the multi-band radiator portions 300 to be utilized in antenna assemblies where a low profile is required or desired. For example, it can be desirable for the antenna assembly 100 to have as low a profile as possible, to allow the antenna assembly 100 to be used in high wind operating conditions or applications that require low visual impact. Accordingly, as the multi-band radiator portions 300 represent the limiting factor in terms of total height of the antenna assembly 100, the low-profile multi-band radiator portions 300 are particularly advantageous. In some implementations, the multi-band radiator portions 300 can have a total height (e.g., from the bottom of the feed point 319 to the top of the second low-band radiation portion 329) of between 0.75 inch and 3 inches. For example, the multi-band radiator portions 300 may have a total height of less than 3 inches, less than 2.5 inches, less than 2 inches, less than 1.5 inches, less than 1 inches, and/or the like.

In some other implementations, the second low-band radiation portion 329 can be coupled to a third low-band radiation portion, a fourth low-band radiation portion, and/or other radiation portions. In some implementations, material forming the second low-band radiation portion 329 can extend in a direction further away from the upright low-band radiation portion 325 and comprise a slit between the material such that portion of material on each side of the slit may form a third low-band radiation portion and a fourth low-band radiation portion respectively, that may be coplanar with and extend beyond the second low-band radiation portion 329. In some implementations the third and fourth low-band radiation portions can be the same length and width. In some implementations, the length and/or width of the third low-band radiation portion may be different from the length and/or width of the fourth low-band radiation portion. In some implementations, one or more of the third low-band radiation portion and the fourth low-band radiation portion may be angled or bent or attached such that it is not coplanar with the second low-band radiation portion 329. Adding variations in radiation portions can provide advantageous coverage in different areas of bandwidth in some implementations.

In some cases, the radiating element 301 is a modified printed inverted-F antenna (PIFA) modified to have three bent arm members that make the radiating element 301 a three-dimensional antenna as opposed to a two-dimensional antenna generally practiced in the art for printed inverted-F antennas. Furthermore, the radiating element 301 can be a dual-band monopole antenna, a multi-band 3D inverted F antenna, or a version of a 2D inverted F antenna similar to a PIFA that has a configuration that, when used in conjunction with high order electromagnetic modes generated or received by a transceiver and/or receiver (as is typically performed for PIFA antennas), permit the radiating element 301 to have an operating frequency range of 500 MHz to 8 GHZ.

The low-band portions (e.g., upright low-band radiation portion 325, the second low-band radiation portion 329, and any additional low-band radiation portions) can be configured for radiation in the low-band (e.g., approximately 600 MHz to 900 MHZ), including low-band odd multiples. The radiating element 301 can also include additional portions configured for radiation above the low-band. For example, the radiating element 301 can include one or more primary arms 327 and/or one or more secondary arms 337. The primary arms 327 and the secondary arms 337 may be configured for operation on different bands or the same bands. For example, the primary arms 327 can be configured for radiation in the mid-band (e.g., approximately 1.7 GHZ to 2.7 GHZ) and the secondary arms 337 can be configured for radiation in the C-band (e.g., approximately 3.4 GHz to 4.2 GHZ). In the illustrated example, the radiating element 301 includes two primary arms 327 and two secondary arms 337. However, more or less arms 327, 337 are possible. Further, in other implementations, the arms 327, 337 or additional/alternative arms can be included in the radiating element 301 and configured for radiation in the high band Wi-Fi band (e.g., approximately 4.8 GHz to 7.25 GHz).

The arms 327 can be coupled to a lower portion of the upright low-band radiation portion 325. In some implementations, the arms 327 can be coupled to an upper portion of the upright low-band radiation portion 325. In some other implementations, one or more additional arms 327 can be coupled to an upper portion of a low-band radiation portion (e.g., upright low-band radiation portion 325, the second low-band radiation portion 329, etc.). In some implementations the arms 327 can have the same length. In some implementations arms 327 can have different lengths. In some implementations, one or more of the arms 327 can be positioned at an angle relative to the upright low-band radiation portion 325 and/or relative to a ground plane (e.g., the base 108). The arms 327 can be positioned at the same angle or at different angles. The arms 327 can be configured for radiation in the mid-band, including higher even order resonances. In some implementations, additional arm portions can be added or formed at selected locations to add coverage for additional high frequency bandwidth areas (e.g., the high band Wi-Fi band). For example, in some implementations, portions of the arms 327 (and/or the arms 337) may be slit, extended, angled, bent, modified, and/or otherwise connected to provide improved coverage areas.

As shown in FIG. 8E, in some implementations, each arm 327 can include a first arm portion 333 and a second arm portion 335. The first arm portions 333 can be coupled to or extend from the upright low-band radiation portion 325, and the second arm portions 335 can be coupled to or extend from the first arm portions 333. The second arm portions 335 can be at a different angle relative to the upright low-band radiation portion 325 and the base 108 compared to the first arm portions 333. The second arm portions 335 can have a different width, thickness, length, and/or bend angle compared to the first arm portions 333. These variations can improve return loss and radiation pattern performance in some cases. In the illustrated example, the first arm portions 333 extend from a lower portion of the upright low-band radiation portion 325 in a direction towards the second low-band radiation portion 329. The first arm portions 333 and the second low-band radiation portion 329 can both extend away from the upright low-band radiation portion 325. In some implementations, the arms 327 can have a maximum height (relative to the base 108) that is substantially the same as the maximum height of the second low-band radiation portion 329 (relative to the base 108).

The arms 337 can extend from or be coupled to the upright low-band radiation portion 325. For example, the arms 337 can be coupled to an upper portion of the upright low-band radiation portion 325. In some implementations, the arms 337 can be positioned above the arms 327, relative to the base 108. In some implementations, the arms 337 can be coupled to a lower portion of the upright low-band radiation portion 325. For example, the arms 337 may be positioned below the arms 327. In some other implementations, one or more additional arms 337 can be coupled to a low-band radiation portion of the radiating element 301 (e.g., the upright low-band radiation portion 325, the second low-band radiation portion 329, etc.). In some implementations the arms 337 can have the same length. In some implementations arms 337 can have different lengths. In some implementations, one or more of the arms 337 can be positioned at an angle relative to the upright low-band radiation portion 325 and/or relative to a ground plane (e.g., the base 108). The arms 337 can be positioned at the same angle or at different angles. As described herein, the arms 337 can be configured for radiation in the C-band (e.g., approximately 3.4 GHz to 4.2 GHZ), including high even order resonances. In some implementations, additional arm portions can be added or formed at selected locations to add coverage for additional high frequency bandwidth areas (e.g., the C-band or higher). For example, in some implementations portions of the arms may be slit, extended, angled, bent, modified, and/or otherwise connected to provide improved coverage areas. In some implementations, the arms 337 can be coplanar to the upright low-band radiation portion 325, as shown in FIG. 8E. In some implementations, the arms 337 can improve return loss at the upper end of the mobile telecommunications spectrum relative to the radiating element 301, which may not include the additional arms similar to the arms 337.

As shown in FIG. 8B, a ground connection 303 (also referred to herein as the "tuner 303") can be adapted and configured to couple the radiating element 301 with the base 108. The tuner 303 can include a face plate 371 that is configured to be coupled to a ground plane (e.g., the base 108). The tuner 303 can include an arm portion 373, which can be an arm portion coupled to the face plate 371. The width of arm portion 373 can be adjusted to accommodate clearance for transmission lines, such as coaxial cables 140 of antenna assembly 100, which can be used to excite the radiating element 301. For example, as shown in FIG. 6B, the illustrated width of the arm portion 373 allows the coaxial cables 140 to extend past the arm portion 373, under the body 375, and to be positioned adjacent the arm portion 373 when coupled to the radiating element 301. Low-band operation of the multi-band radiator portion 300 is enhanced and can be adjusted by the length and width of body portion 325 and head portion 329 as well as the location, placement, and configuration of an opening (not shown) in body portion 325. The tuner 303 can include a body 375 that includes an engagement portion 377. The engagement portion 377 can be adapted and configured to be positioned against the body portion 325 of the radiating element 301. For example, the engagement portion 377 can be positioned against the upright low-band radiation portion 325 such that the body 375 is substantially orthogonal to the upright low-band radiation portion 325. The engagement portion 377 can include one or more tabs 383. The tabs one or more tabs 383 can be twist tabs. The one or more tabs 383 can be received within one or more slots 331 of the upright low-band radiation portion 325. As such, the extension of the tabs 383 through the slots 331 can be a point of coupling, creating a ground connection for the multi-band radiator portion 300. Use of the tabs 383 and the slot 331 for the ground connection can improve grounding, reduce the part count, and/or reduce assembly time, compared to other coupling means such as a nut and threaded fastener. For example, to couple the ground connection 303 to the radiating element 301, the tabs 383 can be inserted in the slots 331 and twisted (e.g., with pliers) to create the connection. This type of connection can be completed more quickly than other connections (such as soldering, nut and fastener, etc.) and can provide a secured connection. In some cases, solder can optionally be used to improve the electrical connection between the ground connection 303 and the radiating element 301; however, the solder is generally not required for the mechanical or electrical connection to be established. The lateral position of the arm portion 373 relative to body 375 can also be selected to accommodate clearance for transmission lines. For example, while the arm portion 373 is shown as positioned on one side of the body 375, this position is not required and the arm portion 373 could be centrally positioned on the body 375 in other implementations. The position and width of the arm portion 373 can also impact the performance of the multi-band radiator portion 300 across the various bands.

As shown in FIG. 6B, the ground connection 303 can be elevated relative to the feed location 319 of the radiating element 301 in the assembled antenna assembly 100. For example, the face plate 371 can be coupled to a portion of the base 108 that is higher than the feed point 319 in the assembled antenna assembly 100. Such a raised connection provides advantages to achieve the multi-band coverage. Dimensions can be selected to provide harmonic resonance at higher odd orders in some implementations. The grounding portion 303 provides advantages for achieving multiple advantageous resonances. Also, the selection of the dimensions for radiating portion 300 may also be adjusted to impact the radiation patterns of the fundamental mode as well as the higher order modes. For example, in some implementations, the height, width, and clearance provided for by the size of arm portion 373 can be advantageously selected. Additionally, the length and width of body portion 375 can also be advantageously selected. For example, the width and length of the arm portion 373 and the body 375 can be adjusted for impedance matching as well as to achieve a desired radiation pattern for the multi-band radiator portion 300. The locations of the one or more slots 331 and one or more tabs 383, when coupled together for the grounding connection create a symbiotic connection to provide a resonance of desired impedance to match a desired frequency and bandwidth and radiation pattern for a low-band frequency configuration in some implementations. In the illustrated example, the slots 331 are near the vertical center of the upright low-band radiation portion 325. The vertical position of the slots 331 on the upright low-band radiation portion 325 is related to the height or length of the arm portion 373. In other implementations, the slots 331 can be located higher or lower on upright low-band radiation portion 325 relative to the vertical axis. The location of the slots 331 (e.g., where the ground connection 303 attaches) relative to the height of the upright low-band radiation portion 325 is selected for impedance matching and the desired behavior of the higher order modes (e.g., where the higher order modes occur). The relative dimensions are also selected so that the radiation patterns comes off of the radiating element 301 in the desired shape and/or direction. The width between the slots 331 can also be variable. In the illustrated example, each slot 331 is located approximately centrally between the central vertical axis of the upright low-band radiation portion 325 and an outside edge of the upright low-band radiation portion 325. In other examples, the slots 331 can be closer or further apart from each other. In some cases, decreasing the width between the slots 331 can require the height of the slots 331 to also be reduced relative to the upright low-band radiation portion 325 for optimal performance of the multi-band radiator portion 300. In some cases, it can be desirable for the slots 331 to be located as high on the upright low-band radiation portion 325 as possible for improved structural benefits. However, the height of the slots 331 is selected generally selected for a balance of good structural support and performance of the multi-band radiator portion 300 across all desired bands.

FIG. 8C shows coupling points 317*a* of the radiating element 301. The twin coupling points 317*a* can be used to attach the multi-band radiator portion 300 to a non-conductive structural stand coupled to the base 108. For example, the non-conductive structural stand can be secured to the mounting portion 110 of the base 108. More isolation can be created from the base 108 by expanding the space 313 and/or the space 311 between the twin coupling points 317*a* and a feed point location 319. The feed point location 319 is configured to receive an electrical connection to excite the radiating element 301. For example, the center conductor 142 of the terminated coaxial cable 140 can be electrically and mechanically coupled to the feed point 319 with the outer conductor 144 being electrically and mechanically coupled to the base 108 via the mounting portion 110. The space 311 can be selected primarily for impedance matching purposes and may vary depending on the particular implementation of the multi-band radiator portion 300 and the antenna assembly 100. For example, changing the dimensions or structure of the base 108 can result in a variation in the size of the space 311. In some implementations, the feed point 319 can be twice the height (e.g., space 311 can be doubled) or greater and/or the feed point 319 can be twice the width (e.g., the narrow width tab 309 can be doubled) or greater. In other implementations, a feed point 319 with different structural features can be used. For example, the radiating element 301 may include a feed point that is a tab. The tab feed point may extend substantially perpendicular to the upright low-band radiation portion 325. In one example, the radiating element 301 can include a feed point that includes a spacer with a push rivet or established via a heat stake operation. In some implementations, the feed point of the radiating element 301 can be configured to be snap fit into a slot or configured as a push pass connection.

In some other implementations, features and aspects of the multi-band radiator portions 300 can be further described as follows. FIG. 8C illustrates the radiating element 301 that can be coupled to the base 108 of the antenna assembly 100 shown in at least FIG. 5, and electrically excited at the feed point 319. For example, as described above, the center conductor 142 of the terminated coaxial cable 140 can be coupled to the feed point 319 with the outer conductor 144 being coupled to the base 108. The feed point 319 can extend from or be coupled to the upright low-band radiation portion 325 with what can be a narrow width tab 309. Additional isolation between the upright low-band radiation portion 325 and the base 108 can be obtained by adjusting 311 and consequently the coupling location reference 313. For additional mechanical support, the upright low-band radiation portion 325 can have a non-conductive coupling mechanism (not shown) to the base 108. For example, the non-conductive coupling mechanism can be secured to the mounting portion 110. The upright low-band radiation portion 325 can have a coupling point (e.g., one or more slots 331) for attaching the grounding portion 303 with via the one or more tabs 383. As noted above, also extending from/coupled to the upright low-band radiation portion 325 can be one or more primary arms 327 and/or one or more secondary arms 337. The arms 327, 337 can assist with the dominate radiation in the mid-band and C-band for the multi-band radiator portion 300. One or more portions similar to the arms 327, 337 may be used for assisting in the high band portion of the radiation are realizable in the implementation of this approach. Higher even order resonances may radiate from portions similar to the arms 327, 337 of the radiating element 301 to assist in the multi-band properties of the device. Furthermore, there can be the additional head portion 329 coupled to the upright low-band radiation portion 325 that may be perpendicular in nature for its orientation. Though it is not necessary for it to be bent near 90-degrees as depicted in this illustration and can be shown to be perceptibly straight in other implementations. By bending the low-band radiation portion of the radiating element 301 to realize two distinct portions (e.g., the upright low-band radiation portion 325 and the second low-band radiation portion 329), the total height of the radiating element 301 is reduced and as such the total volume of the antenna assembly 100 to most likely provide environmental protection is consequently reduced. The low-band operation of the radiating element 301 is determined by several factors. Some of the factors are the length and width of the upright low-band radiation portion 325 and of the second low-band radiation portion 329, the location of opening one or more slots 331, and/or the grounding portion 303.

FIG. 8B illustrates the grounding portion of the device 303. The face plate 371 can extend from or be coupled to the arm 373. The width of the arm 373 can be adjusted to accommodate clearance for assembly purposes for a transmission line of the antenna assembly 100 that may be used for excitation of the multi-band radiator portion 300. The body 375 can extend from or be coupled to arm 373. The engagement portion 377 can be coupled to or form a portion of the body 375. The engagement portion 377 can also have one or more coupling points (e.g., one or more tabs 383) that are configured to couple to the opening one or more slots 331 of the radiating element 301 in the assembled multi-band radiator portion 300. The height of the arm 373, the width of the arm 373, the clearance provided for in the arm 373, the length of body 375, and the symbiotic location of slots 331 and/or tabs 383 can provide for a reactance that counterbalances the reactance of the low-band impedance to provide a resonance of desired impedance match for the desired frequency and bandwidth for the low-band radiation. The location of the coupling points (e.g., one or more tabs 383) and the length and width of the grounding portion 303 are also chosen to provide higher odd order resonant harmonics at the desired locations to cover a portion of the frequency band of the multi-band performance of the antenna assembly 204. Further, the relative dimensions described above also influence the radiation pattern generated by the radio frequency excitation of the multi-band radiator portion 300.

FIG. 8C illustrates a back side view of the radiating element 301. Twin coupling points 317*a* in the radiating element 301 may be coupled to a non-conductive object (not shown), which can be coupled to the base 108 (e.g., mounting portions 110) of the antenna assembly 100. This coupling may provide mechanical stability for the multi-band radiator portions 300 while not disturbing or inhibiting the ground connection provided by the ground connection 303.

FIGS. 8D-8F provide additional views of the radiating element 301. As shown in FIGS. 8D and 8F, the second low-band radiation portion 329 can include one or more clearances. For example, the second low-band radiation portion 329 can include one or more first clearances 357*a* and/or one or more second clearances 357*b*. The clearances 357*a*, 357*b* can be holes or openings formed in the second low-band radiation portion 329. The clearances 357*a*, 357*b* may allow for case of assembly of the completed multi-band radiator portions 300. FIG. 8G-8H provide additional views of the ground connection 303 of the multi-band radiator portions 300.

In some implementations, the antenna assembly 100 can include one or more millimeter wave radios. For example, the one or more millimeter wave radios can form part of the multi-element multi-band antenna 102. FIGS. 9A-9D illustrate four example millimeter wave radios 250A, 250B, 250C, 250D respectively (collectively millimeter wave radios 250), any of which can be included in the antenna assembly 100. While four example millimeter wave radios 250 are provided, in other implementations, different or modified millimeter wave radios 250 can be included in the antenna assembly 100. The millimeter wave radios 250 can be included in addition to or alternatively to the multi-band radiator portion 300 and the second radiating elements 200. For example, in some implementations, the antenna assembly 100 may include one or more multi-band radiator portions 300, one or more second radiating elements 200, and one or more millimeter wave radios 250. In some cases, the antenna assembly 100 can include up to four of each of the multi-band radiator portions 300, the second radiating elements 200, and the millimeter wave radios 250. The millimeter wave radios 250 can operated in the millimeter wave frequency spectrum (approximately between 30 GHz and 300 GHz), with wavelengths ranging from 1 to 10 millimeters approximately. The millimeter wave radios 250 can be used for high-frequency communication. Including one or more millimeter wave radios 250 can improve or support high data transfer rates of the antenna assembly 100 over short distances. For example, the millimeter wave radios 250 can be configured to transmit large amounts of data, which can be ideal for 5G network applications and high-speed wireless communication for the antenna assembly 100.

Figure 9A:
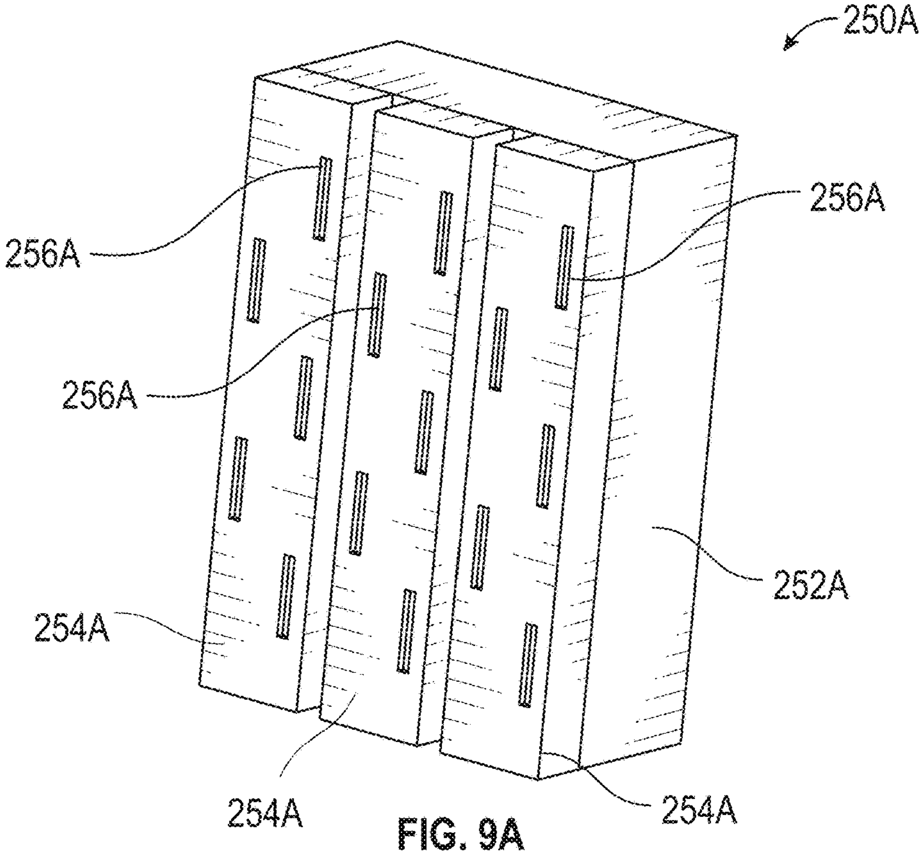
FIGS. 9A-9D illustrate various embodiments of millimeter wave radios with their antennas that can be included in the antenna assembly of FIG. 1, in accordance with some aspects of this disclosure.

FIG. 9A illustrates a first example of a millimeter wave radio 250A that can be included in the antenna assembly 100. The millimeter wave radio 250A can be a slotted waveguide array millimeter wave radio. The millimeter wave radio 250A can include a millimeter wave radio 252A and one or more waveguides 254A. In the illustrated example, three waveguides 254A are included. The waveguides 254A can be hollow metallic structures that direct electromagnetic waves. Each waveguide 254A can include slots 256A cut into its surface to allow for controlled radiation. For case of illustration, not all slots 256A in FIG. 9A are labeled. The waveguides 254A can serve as a conduit for the millimeter-wave signals, efficiently transmitting them along its length with minimal loss. The slots 256A can act as the radiating elements for the millimeter wave radio 250A, emitting the millimeter wave signals. The position and size of the slots 256A can be selected to achieve a highly directional beam. In some implementations, the waveguides 254A can be configured to create an array of slots 256A. Such an array can be used to form a high-gain, highly directional antenna, which can be ideal for focusing energy in a specific direction or scanned along a portion of the horizon, which may be desirable.

Figure 9B:
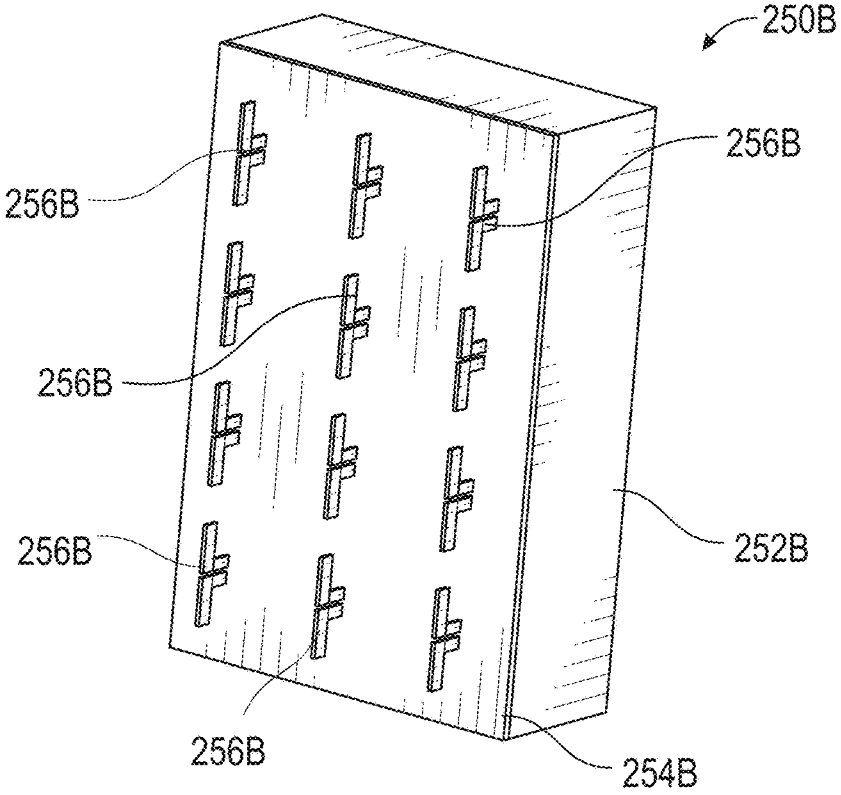

FIG. 9B illustrates a second example of a millimeter wave radio 250B that can be included in the antenna assembly 100. The millimeter wave radio 250B can be a dipole array millimeter wave radio. The millimeter wave radio 250B can include a millimeter wave radio 252B, a microwave grade PCB portion 254B, and a plurality of dipole antennas 256B. The dipole antennas 256B can be arranged in an array on the PCB portion 254B. The PCB portion 254B can include a ground plane (not shown) on its back side (e.g., the side closest to the millimeter wave radio 252B). For case of illustration, not all of the dipole antennas 256B in FIG. 9B are labeled. The dipole antennas 256B can be substantially smaller compared to other antennas of the antenna assembly 100 because of the short wavelength of the millimeter wave radio 250B. Arranging the dipole antennas 256B in an array can enhance the gain, directivity, and/or beamforming capabilities of the millimeter wave radio 250B. The phase and amplitude of signals fed to each dipole antenna 256B can be selected to focus the energy in a specific direction. For example, highly directional and scannable radiation patterns can be generated by the millimeter wave radio 250B.

Figure 9C:
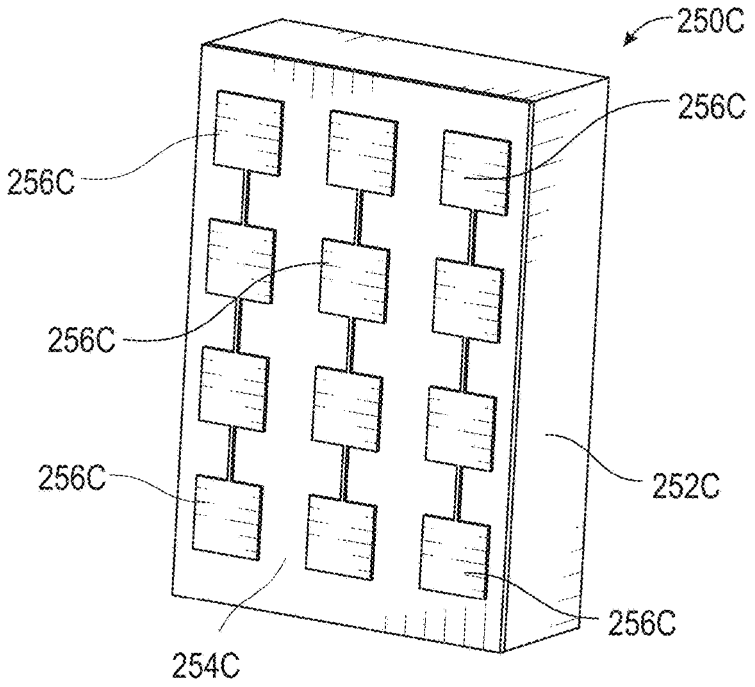

FIG. 9C illustrates a third example of a millimeter wave radio 250C that can be included in the antenna assembly 100. The millimeter wave radio 250C can be a microstrip patch array millimeter wave radio. The millimeter wave radio 250C can include a millimeter wave radio 252C, a microwave grade PCB portion 254C, and a plurality of microstrip patch antennas 256C. The microstrip patch antennas 256C can be flat rectangular antennas comprising a conductive material (e.g., a metal). The microstrip patch antennas 256C can be arranged in an array on the PCB portion 254C. The PCB portion 254C can include a ground plane (not shown) on its back side (e.g., the side closest to the millimeter wave radio 252C). For case of illustration, not all of the microstrip patch antennas 256C in FIG. 9C are labeled. The microstrip patch antennas 256C can be substantially smaller compared to other antennas of the antenna assembly 100 because of the short wavelength of the millimeter wave radio 250C. Arranging the microstrip patch antennas 256C in an array can enhance the gain, directivity, and/or beamforming capabilities of the millimeter wave radio 250C. The feed network of the microstrip patch antenna array can be controlled to allow for precise beamforming and higher directional accuracy. Alternatively, elements can be individually fed as opposed to serially fed to form a highly scannable array in both azimuth and elevation.

Figure 9D:
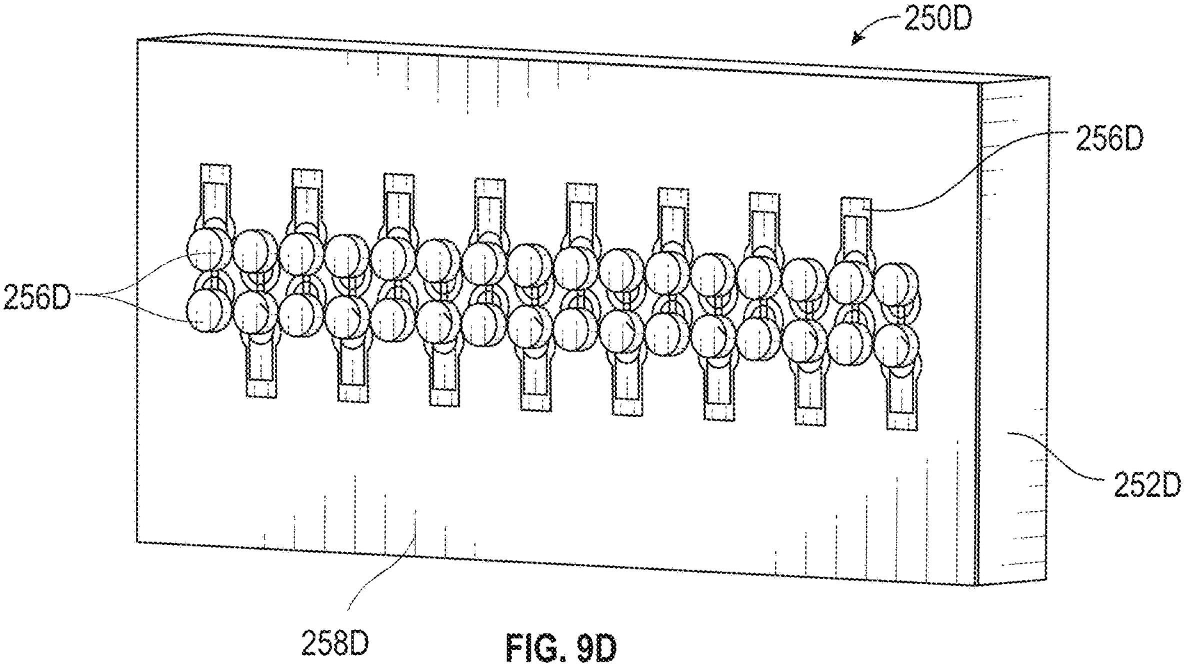

FIG. 9D illustrates a fourth example of a millimeter wave radio 250D that can be included in the antenna assembly 100. The millimeter wave radio 250D can be a coplanar waveguide feed cylindrical dielectric resonator array millimeter wave radio. The millimeter wave radio 250D can include a millimeter wave radio 252D, a microwave grade PCB portion 254D, a plurality of dielectric resonator antennas 256D, and a ground plane 258D. The dielectric resonator antennas 256D can be constructed of a non-metallic materials (e.g., dielectrics) and can be the radiating elements of the millimeter wave radio 250D. The dielectric resonator antennas 256D can be cylindrically shaped, which can help confine and radiate electromagnetic energy effectively at millimeter-wave frequencies. The dielectric resonator antennas 256D can be arranged in an array on the PCB portion 254D. For case of illustration, not all of the dielectric resonator antennas 256D in FIG. 9D are labeled. The dielectric resonator antennas 256D can be substantially smaller compared to other antennas of the antenna assembly 100 because of the short wavelength of the millimeter wave radio 250D. Arranging the dielectric resonator antennas 256D in an array can enhance the gain, directivity, and/or beamforming capabilities of the millimeter wave radio 250D.

The particular implementations disclosed above are illustrative only, as the application may be modified and practiced in different but equivalent manners apparent to those skilled in the art having the benefit of the teachings herein. It is therefore evident that the particular implementations disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

Example Clauses

Various examples of systems relating to an antenna system are found in the following clauses:

Clause 1. A multi-band antenna, comprising: a plurality of first radiating structures, each first radiating structure of the plurality of first radiating structures comprising a first upright radiation portion and a first top radiation portion extending from the first upright radiation portion; a plurality of second radiating structures, each second radiating structure of the plurality of second radiating structures comprising a second upright radiation portion and a second top radiation portion extending from the second upright radiation portion; a plurality of third radiating structures; and a base PCB, wherein the plurality of first radiating structures, the plurality of second radiating structures, and the plurality of third radiating structures are positioned on the base PCB around a center of the multi-band antenna, wherein the plurality of first radiating structures are positioned adjacent to the plurality of second radiating structures, and wherein the first top radiation portion and the second top radiating portion of adjacent first radiating structures and second radiating structures extend in a opposite directions.

Clause 2. An antenna assembly, comprising: a base; a radome, the radome configured to be removably coupled to the base; at least one GPS antenna coupled to the base; one or more WiFi antennas coupled to the base; and one or more multi-band radiator portions coupled to the base.

Clause 3. The antenna assembly of Clause 2, wherein each multi-band radiator portion of the one or more multi-band radiator portions comprises: a feeding portion; a grounding portion; an upright low band radiation portion; a second low band radiation portion; and a high band radiation portion.

Clause 4. The antenna assembly of any of Clauses 3, wherein the second low band radiation portion is not-coplanar with the upright low band radiation portion.

Clause 5. The antenna assembly of any of Clauses 13, wherein the second low band radiation portion is coplanar with the upright low band radiation portion.

Clause 6. The antenna assembly of any of Clauses 3-5, wherein the high band radiation portion comprises two primary arms coupled to a base of the upright low band radiation portion.

Clause 7. The antenna assembly of Clause 6, wherein each primary arm comprises a first arm portion and a second arm portion, wherein the first arm portion is coupled to the upright low band radiation portion and the second arm portion extends from the first arm portion.

Clause 8. The antenna assembly of Clause 7, wherein the first arm portion has a varying width along a length of the first arm portion.

Clause 9. The antenna assembly of Clause 7 or Clause 8, wherein the second arm portion has a consistent width along a length of the second arm portion.

Clause 10. The antenna assembly of any of Clauses 3-5, wherein the high band radiation portion comprises a single primary arm coupled to a base of the upright low band radiation portion.

Clause 11. The antenna assembly of any of Clauses 3-5, wherein the high band radiation portion comprises a plurality of primary arms coupled to a base of the upright low band radiation portion.

Clause 12. The antenna assembly of any of Clauses 3-5, wherein the high band radiation portion comprises a plurality of primary arms of different lengths coupled to a base of the upright low band radiation portion.

Clause 13. The antenna assembly of any of Clauses 3-12, wherein each multi-band radiator portion of the one or more multi-band radiator portions further comprises: a third low band radiation portion coupled to the second low band radiation portion; and a fourth low band radiation portion coupled to the second low band radiation portion and not contacting the third low band radiation portion.

Clause 14. The antenna assembly of Clause 13, wherein the third low band radiation portion has a first dimension, wherein the fourth low band radiation portion has a second dimension, and wherein the first dimension and the second dimension are substantially the same.

Clause 15. The antenna assembly of Clause 13, wherein the third low band radiation portion has a first dimension, wherein the fourth low band radiation portion has a second dimension, and wherein the first dimension and the second dimension are different.

Clause 16. The antenna assembly of any of Clauses 3-15 wherein the high band radiation portion further comprises one or more secondary arms coupled to the upright low band radiation portion.

Clause 17. The antenna assembly of Clause 16, wherein the one or more secondary arms are coplanar to the upright low band radiation portion.

Clause 18. The antenna assembly of Clause 16, wherein the one or more secondary arms are not coplanar to the upright low band radiation portion.

Clause 19. The antenna assembly of any of Clauses 16-18, wherein the one or more secondary arms comprise two secondary arms.

Clause 20. The antenna assembly of any of Clauses 3-19, wherein the one or more multi-band radiator portions comprises four multi-band radiator portions.

Clause 21. The antenna assembly of any of Clauses 1-20, wherein the one or more WiFi antennas comprises eight dual-band WiFi radiator portions.

Clause 22. A multi-band antenna comprising a radiating element, the radiating element comprising: an upright portion configured for low-band radiation; a head portion extending from a top edge of the upright portion, the head portion configured for low-band radiation; one or more first arms extending from the upright portion, the one or more first arms configured for mid-band radiation; and one or more second arms extending from the upright portion, the one or more second arms configured for C-band radiation.

Clause 23. The multi-band antenna of clause 22, wherein the multi-band antenna is formed from a conductive sheet comprising the upright portion, the head portion, the one or more first arms, and the one or more second arms.

Clause 24. The multi-band antenna of clause 22, wherein the multi-band antenna is formed of one or more PCB portions, the one or more PCB portions comprising the upright portion, the head portion, the one or more first arms, and the one or more second arms.

Clause 25. The multi-band antenna of any of clauses 22 to 24, wherein the head portion extends angularly from the upright portion.

Clause 26. The multi-band antenna of clause 25, wherein the head portion extends from the upright portion at an angle at or within 89-91 degrees.

Clause 27. The multi-band antenna of any of clauses 22 to 26, wherein the one or more first arms extend angularly from the upright portion.

Clause 28. The multi-band antenna of any of clauses 22 to 27, wherein the one or more first arms comprise a first left arm that extends from a left side of the upright portion and a first right arm that extends from a right side of the upright portion.

Clause 29. The multi-band antenna of clause 28, wherein the first left arm comprises a first left arm portion extending from the left side of the upright portion and a second left arm portion extending from the first left arm portion, and the first right arm comprises a first right arm portion extending from the right side of the upright portion and a second right arm portion extending from the first right arm portion.

Clause 30. The multi-band antenna of clause 29, wherein the first right arm portion has a varying width along a length of the first right arm portion and the first left arm portion has a varying width along a length of the first left arm portion.

Clause 31. The multi-band antenna of clause 29 or clause 30, wherein the second left arm portion has a consistent width along a length of the second left arm portion and the second right arm portion has a consistent width along a length of the second right arm portion.

Clause 32. The multi-band antenna of any of clauses 29 to 31, wherein the second left arm portion and the second right arm portion are substantially orthogonal to the upright portion.

Clause 33. The multi-band antenna of any of clauses 22 to 32, wherein the one or more second arms comprise a second left arm that extends from a left side of the upright portion and a second right arm that extends from a right side of the upright portion.

Clause 34. The multi-band antenna of clause 33, wherein the second left arm and the second right arm are coplanar with the upright portion.

Clause 35. The multi-band antenna of any of clauses 22 to 34, wherein the one or more second arms are positioned on the upright portion between the head portion and the one or more first arms.

Clause 36. The multi-band antenna of any of clauses 22 to 35, wherein the upright portion comprises one or more slots configured to receive projection of a ground connection.

Clause 37. The multi-band antenna of any of clauses 22 to 36, further comprising a feed point extending from a bottom edge of the upright portion.

Clause 38. The multi-band antenna of any of clauses 22 to 37, wherein the head portion further comprises a first set of apertures located proximate to the top edge of the upright portion.

Clause 39. The multi-band antenna of any of clauses 22 to 38, further comprising one or more additional low-band portions extending from the head portion or the upright portion and configured for low-band radiation.

Clause 40. The multi-band antenna of any of clauses 22 to 39, wherein at least one of the upright portion and the head portion is configured to have multiple resonances that are odd multiples of a lowest low-band resonance.

Clause 41. The multi-band antenna of any of clauses 22 to 40, wherein at least one of the one or more first arms and the one or more second arms is configured to have multiple resonances that are even multiples of a lowest low-band resonance.

Clause 42. The multi-band antenna of any of clauses 22 to 41, further comprising a ground connection, the ground connection comprising: a face plate configured to be coupled to a ground reference; a body portion configured to be coupled to the upright portion; and an arm portion extending between the face plate and the body portion.

Clause 43. The multi-band antenna of clause 42, wherein the body portion further comprises one or more tabs, the one or more tabs configured to be received within slots of the upright portion to electrically connect the ground connection to the radiating element.

Clause 44. The multi-band antenna of clause 43, wherein the one or more tabs are configured to be twisted once received within the slots of the upright portion to mechanically connect the ground connection to the radiating element.

Clause 45. The multi-band antenna of any of clauses 42 to 44, wherein the arm portion has a smaller width than the body portion.

Clause 46. The multi-band antenna of any of clauses 42 to 45, wherein the arm portion extends from one side of a back side of the body portion such that a coaxial cable can extend past the arm portion and under the body portion when the coaxial cable is coupled to the radiating element.

Clause 47. A multi-band antenna comprising: an upright portion configured as a first resonating component; a head portion extending angularly from the upright portion, the head portion configured as a second resonating component; a first left arm extending from a left edge of the upright portion, the first left arm configured as a third resonating component; a first right arm extending from a right edge of the upright portion, the first right arm configured as a fourth resonating component; a second left arm extending from the left edge of the upright portion, the second left arm configured as a fifth resonating component; and a second right arm extending from the right edge of the upright portion, the second right arm configured as a sixth resonating component.

Clause 48. The multi-band antenna of clause 47, wherein the first resonating component and the second resonating component are configured to resonate within a low-frequency band of between 600 MHz and 900 MHz during use.

Clause 49. The multi-band antenna of clause 47 or clause 48, wherein the third resonating component and the fourth resonating component are configured to resonate within a mid-frequency band of between 1.7 GHZ and 2.7 GHz during use.

Clause 50. The multi-band antenna of any of clauses 47 to 49, wherein the fifth resonating component and the sixth resonating component are configured to resonate within a CBRS-frequency band of between 3.4 GHz and 4.2 GHz during use.

Clause 51. The multi-band antenna of any of clauses 47 to 50, wherein the multi-band antenna is formed from a conductive sheet comprising the upright portion, the head portion, the first left arm, the first right arm, the second left arm, and the second right arm.

Clause 52. The multi-band antenna of any of clauses 47 to 51, wherein the multi-band antenna is formed of one or more PCB portions, the one or more PCB portions comprising the upright portion, the head portion, the first left arm, the first right arm, the second left arm, and the second right arm.

Clause 53. The multi-band antenna of any of clauses 47 to 52, wherein the head portion extends from the upright portion at an angle at or within 89-91 degrees.

Clause 54. The multi-band antenna of any of clauses 47 to 53, wherein the first left arm and the first right arm extend angularly from the upright portion.

Clause 55. The multi-band antenna of any of clauses 47 to 54, wherein the first left arm comprises a first left arm portion extending from the left edge of the upright portion and a second left arm portion extending from the first left arm portion, and the first right arm comprises a first right arm portion extending from the right edge of the upright portion and a second right arm portion extending from the first right arm portion.

Clause 56. The multi-band antenna of clause 55, wherein the first right arm portion has a varying width along a length of the first right arm portion and the first left arm portion has a varying width along a length of the first left arm portion.

Clause 57. The multi-band antenna of clause 55 or clause 56, wherein the second left arm portion has a consistent width along a length of the second left arm portion and the second right arm portion has a consistent width along a length of the second right arm portion.

Clause 58. The multi-band antenna of any of clauses 55 to 57, wherein the second left arm portion and the second right arm portion are substantially orthogonal to the upright portion.

Clause 59. The multi-band antenna of any of clauses 47 to 58, wherein the second left arm and the second right arm are coplanar with the upright portion.

Clause 60. The multi-band antenna of any of clauses 47 to 59, wherein the second left arm and the second right arm are positioned on the upright portion between the head portion and the first left arm and the first right arm.

Clause 61. The multi-band antenna of any of clauses 47 to 60, wherein the upright portion comprises one or more slots configured to receive projection of a ground connection.

Clause 62. The multi-band antenna of any of clauses 47 to 61, further comprising a feed point extending from a bottom edge of the upright portion.

Clause 63. The multi-band antenna of any of clauses 47 to 62, wherein the head portion further comprises a first set of apertures located proximate to a top edge of the upright portion.

Clause 64. The multi-band antenna of any of clauses 47 to 63, further comprising one or more additional low-band portions extending from the head portion or the upright portion and configured for low-band radiation.

Clause 65. The multi-band antenna of any of clauses 47 to 64, wherein at least one of the upright portion and the head portion is configured to have multiple resonances that are odd multiples of a lowest low-band resonance.

Clause 66. The multi-band antenna of any of clauses 47 to 65, wherein at least one of the first left arm, the first right arm, the second left arm, and the second right arm is configured to have multiple resonances that are even multiples of a lowest low-band resonance.

Clause 67. The multi-band antenna of any of clauses 47 to 66, further comprising a ground connection, the ground connection comprising: a face plate configured to be coupled to a ground reference; a body portion configured to be coupled to the upright portion; and an arm portion extending between the face plate and the body portion.

Clause 68. The multi-band antenna of clause 67, wherein the body portion further comprises one or more tabs, the one or more tabs configured to be received within slots of the upright portion to electrically connect the ground connection to the upright portion.

Clause 69. The multi-band antenna of clause 68, wherein the one or more tabs are configured to be twisted once received within the slots of the upright portion to mechanically connect the ground connection to the upright portion.

Clause 70. The multi-band antenna of any of clauses 67 to 69, wherein the arm portion has a smaller width than the body portion.

Clause 71. The multi-band antenna of any of clauses 67 to 70, wherein the arm portion extends from one side of a back side of the body portion such that a coaxial cable can extend past the arm portion and under the body portion when the coaxial cable is coupled to the upright portion.

Clause 72. An antenna assembly comprising: a base, the base comprising a conductive material and configured as a ground reference for the antenna assembly; a radome configured to be coupled to the base to define an internal volume; and a multi-element multi-band antenna comprising: one or more multi-band antennas coupled to the base; and one or more second radiating elements coupled to the base.

Clause 73. The antenna assembly of clause 72, wherein the one or more multi-band antennas each comprise the multi-band antenna defined by any of clauses 22 to 46.

Clause 74. The antenna assembly of clause 72, wherein the one or more multi-band antennas each comprise the multi-band antenna defined by any of clauses 47 to 71.

Clause 75. The antenna assembly of any of clauses 72 to 74, wherein the one or more second radiating elements comprise a conductive portion formed on a PCB portion.

Clause 76. The antenna assembly of clause 75, wherein the conductive portion has a generally rectangular shape and extends to a feed point at a bottom of the conductive portion.

Clause 77. The antenna assembly of clause 75, wherein the conductive portion comprises: a central conductive portion being generally T-shaped; a first arm; and a second arm.

Clause 78. The antenna assembly of clause 77, wherein the central conductive portion is configured to resonate within a mid-frequency band of between 2.4 GHz and 2.5 GHz during use and the first arm and second arm are configured to resonate within a Wi-Fi-frequency band of between 4.8 GHz and 7.25 GHz during use.

Clause 79. The antenna assembly of any of clauses 75 to 78, wherein the one or more second radiating elements are configured as multi-band Wi-Fi radios and are configured for operation at frequencies above 1 GHz.

Clause 80. The antenna assembly of any of clauses 72 to 79, wherein the multi-element multi-band antenna further comprises one or more millimeter wave radios configured for operation at frequencies between 30 GHz and 300 GHz.

Clause 81. The antenna assembly of clause 80, wherein the one or more millimeter wave radios comprise slotted waveguide array millimeter wave radios, dipole array millimeter wave radios, microstrip patch array millimeter wave radios, or coplanar waveguide feed cylindrical dielectric resonator array millimeter wave radios.

Clause 82. The antenna assembly of any of clauses 72 to 81, further comprises a GPS antenna.

Clause 83. The antenna assembly of any of clauses 72 to 82, wherein the one or more multi-band antennas and the one or more second radiating elements are arranged around a perimeter of the base.

Clause 84. The antenna assembly of any of clauses 72 to 83, wherein the base comprises a central opening configured for routing coaxial cables through the base and to the one or more multi-band antennas and the one or more second radiating elements.

Clause 85. The antenna assembly of any of clauses 72 to 84, wherein the base comprises a plurality of ribs configured to provide structural support for the base.

Clause 86. The antenna assembly of any of clauses 72 to 85, wherein the antenna assembly is IP67 rated.

Clause 87. The antenna assembly of any of clauses 72 to 86, wherein the base comprises a rim extending around a perimeter of the base, the rim configured to receive a gasket to prevent ingress of fluid and dust into the internal volume.

Clause 88. The antenna assembly of any of clauses 72 to 87, wherein the base is circular shaped and has a diameter of less than 11 inches.

Clause 89. The antenna assembly of any of clauses 72 to 88, wherein the base and radome when coupled have a maximum height of less than 2.5 inches.

Additional Considerations and Terminology

Features, materials, characteristics, or groups described in conjunction with a particular aspect, implementation, or example are to be understood to be applicable to any other aspect, implementation or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing implementations. The protection extends to any novel one, or any novel combination, of the features disclosed in this specification (including any accompanying claims, abstract and drawings), or to any novel one, or any novel combination, of the steps of any method or process so disclosed.

While certain implementations have been described, these implementations have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some implementations, the actual steps taken in the processes illustrated or disclosed may differ from those shown in the figures. Depending on the implementation, certain of the steps described above may be removed, others may be added. For example, the actual steps or order of steps taken in the disclosed processes may differ from those shown in the figure. Depending on the implementation, certain of the steps described above may be removed, others may be added. Furthermore, the features and attributes of the specific implementations disclosed above may be combined in different ways to form additional implementations, all of which fall within the scope of the present disclosure.

Although the present disclosure includes certain implementations, examples and applications, it will be understood by those skilled in the art that the present disclosure extends beyond the specifically disclosed implementations to other alternative implementations or uses and obvious modifications and equivalents thereof, including implementations which do not provide all of the features and advantages set forth herein. Accordingly, the scope of the present disclosure is not intended to be limited by the described implementations, and may be defined by claims as presented herein or as presented in the future.

Conditional language, such as "can," "could," "might," or "may," unless specifically stated otherwise, or otherwise understood within the context as used, is generally intended to convey that certain implementations include, while other implementations do not include, certain features, elements, or steps. Thus, such conditional language is not generally intended to imply that features, elements, or steps are in any way required for one or more implementations or that one or more implementations necessarily include logic for deciding, with or without user input or prompting, whether these features, elements, or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Likewise the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

What is claimed is:

1. A multi-band antenna comprising a radiating element, the radiating element comprising:
- an upright portion configured for low-band radiation;
- a head portion extending from a top edge of the upright portion, the head portion configured for low-band radiation;
- one or more first arms extending from the upright portion, the one or more first arms configured for mid-band radiation, the one or more first arms comprising:
  - a first left arm comprising a first left arm portion extending from a left side of the upright portion and a second left arm portion extending from the first left arm portion; and a first right arm comprising a first right arm portion extending from a right side of the upright portion and a second right arm portion extending from the first right arm portion; and one or more second arms extending from the upright portion, the one or more second arms configured for C-band radiation.

2. The multi-band antenna of claim 1, wherein the one or more first arms extend angularly from the upright portion.

3. The multi-band antenna of claim 1, wherein the first right arm portion has a varying width along a length of the first right arm portion and the first left arm portion has a varying width along a length of the first left arm portion.

4. The multi-band antenna of claim 1, wherein the second left arm portion has a consistent width along a length of the second left arm portion and the second right arm portion has a consistent width along a length of the second right arm portion.

5. The multi-band antenna of claim 1, wherein the second left arm portion and the second right arm portion are substantially orthogonal to the upright portion.

6. A multi-band antenna comprising a radiating element, the radiating element comprising:

an upright portion configured for low-band radiation;

a head portion extending from a top edge of the upright portion, the head portion configured for low-band radiation;

one or more first arms extending from the upright portion, the one or more first arms configured for mid-band radiation; and one or more second arms extending from the upright portion, the one or more second arms configured for C-band radiation, the one or more second arms comprising:

a second left arm that extends from a left side of the upright portion; and a second right arm that extends from a right side of the upright portion.

7. The multi-band antenna of claim 6, wherein the second left arm and the second right arm are coplanar with the upright portion.

8. A multi-band antenna comprising a radiating element, the radiating element comprising:

an upright portion configured for low-band radiation;

a head portion extending from a top edge of the upright portion, the head portion configured for low-band radiation;

one or more first arms extending from the upright portion, the one or more first arms configured for mid-band radiation; and one or more second arms extending from the upright portion, the one or more second arms configured for C-band radiation, wherein the one or more second arms are positioned on the upright portion between the head portion and the one or more first arms.

9. A multi-band antenna comprising:

an upright portion configured as a first resonating component;

a head portion extending angularly from the upright portion, the head portion configured as a second resonating component;

a first left arm extending from a left edge of the upright portion, the first left arm configured as a third resonating component;

a first right arm extending from a right edge of the upright portion, the first right arm configured as a fourth resonating component;

a second left arm extending from the left edge of the upright portion, the second left arm configured as a fifth resonating component; and a second right arm extending from the right edge of the upright portion, the second right arm configured as a sixth resonating component.

10. The multi-band antenna of claim 9, wherein the first resonating component and the second resonating component are configured to resonate within a low-frequency band of between 600 MHz and 900 MHz during use.

11. The multi-band antenna of claim 9, wherein the third resonating component and the fourth resonating component are configured to resonate within a mid-frequency band of between 1.7 GHZ and 2.7 GHz during use.

12. The multi-band antenna of claim 9, wherein the fifth resonating component and the sixth resonating component are configured to resonate within a CBRS-frequency band of between 3.4 GHz and 4.2 GHz during use.

13. The multi-band antenna of claim 9, wherein at least one of the upright portion or the head portion is configured to have multiple resonances that are odd multiples of a lowest low-band resonance, and wherein at least one of the first left arm, the first right arm, the second left arm, or the second right arm is configured to have multiple resonances that are even multiples of a lowest low-band resonance.

14. The multi-band antenna of claim 9, further comprising a ground connection, the ground connection comprising:

a face plate configured to be coupled to a ground reference;

a body portion configured to be coupled to the upright portion; and an arm portion extending between the face plate and the body portion.

15. The multi-band antenna of claim 14, wherein the body portion further comprises one or more tabs, the one or more tabs configured to be received within slots of the upright portion to electrically connect the ground connection to the upright portion.

16. The multi-band antenna of claim 15, wherein the one or more tabs are configured to be twisted once received within the slots of the upright portion to mechanically connect the ground connection to the upright portion.

17. The multi-band antenna of claim 14, wherein the arm portion has a smaller width than the body portion.

18. The multi-band antenna of claim 14, wherein the arm portion extends from one side of a back side of the body portion such that a coaxial cable can extend past the arm portion and under the body portion when the coaxial cable is coupled to the upright portion.

19. The multi-band antenna of claim 6, wherein the one or more first arms extend angularly from the upright portion.

20. The multi-band antenna of claim 8, wherein the one or more first arms extend angularly from the upright portion.

* * * * *